Jan. 20, 1959  G. H. LEONARD  2,869,782

MECHANICAL COUNTER NUMERAL WHEEL RECTIFYING APPARATUS

Filed June 21, 1954  8 Sheets-Sheet 1

INVENTOR.
GEORGE H. LEONARD
BY John C. Dorfman
ATTORNEY

Jan. 20, 1959 G. H. LEONARD 2,869,782
MECHANICAL COUNTER NUMERAL WHEEL RECTIFYING APPARATUS
Filed June 21, 1954 8 Sheets-Sheet 2

*INVENTOR.*
GEORGE H. LEONARD
BY
ATTORNEY

Jan. 20, 1959 G. H. LEONARD 2,869,782
MECHANICAL COUNTER NUMERAL WHEEL RECTIFYING APPARATUS
Filed June 21, 1954 8 Sheets-Sheet 3

*INVENTOR.*
GEORGE H. LEONARD
BY John C. Dorfman
ATTORNEY

Jan. 20, 1959 G. H. LEONARD 2,869,782
MECHANICAL COUNTER NUMERAL WHEEL RECTIFYING APPARATUS
Filed June 21, 1954 8 Sheets-Sheet 4

*INVENTOR.*
GEORGE H. LEONARD
BY
ATTORNEY

Jan. 20, 1959  G. H. LEONARD  2,869,782
MECHANICAL COUNTER NUMERAL WHEEL RECTIFYING APPARATUS
Filed June 21, 1954  8 Sheets-Sheet 5

*INVENTOR.*
GEORGE H. LEONARD
BY
*John C. Dorfman*
ATTORNEY

*INVENTOR.*
GEORGE H. LEONARD
BY
*John C. Dorfman*
ATTORNEY

Jan. 20, 1959        G. H. LEONARD        2,869,782

MECHANICAL COUNTER NUMERAL WHEEL RECTIFYING APPARATUS

Filed June 21, 1954        8 Sheets-Sheet 7

INVENTOR.
GEORGE H. LEONARD
BY
*John C. Dorfman*
ATTORNEY

Jan. 20, 1959 G. H. LEONARD 2,869,782
MECHANICAL COUNTER NUMERAL WHEEL RECTIFYING APPARATUS
Filed June 21, 1954 8 Sheets-Sheet 8
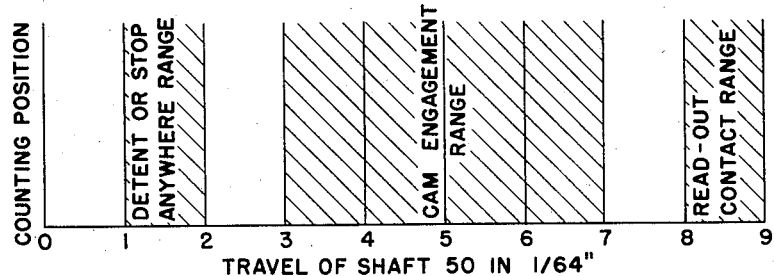
FIG. 44
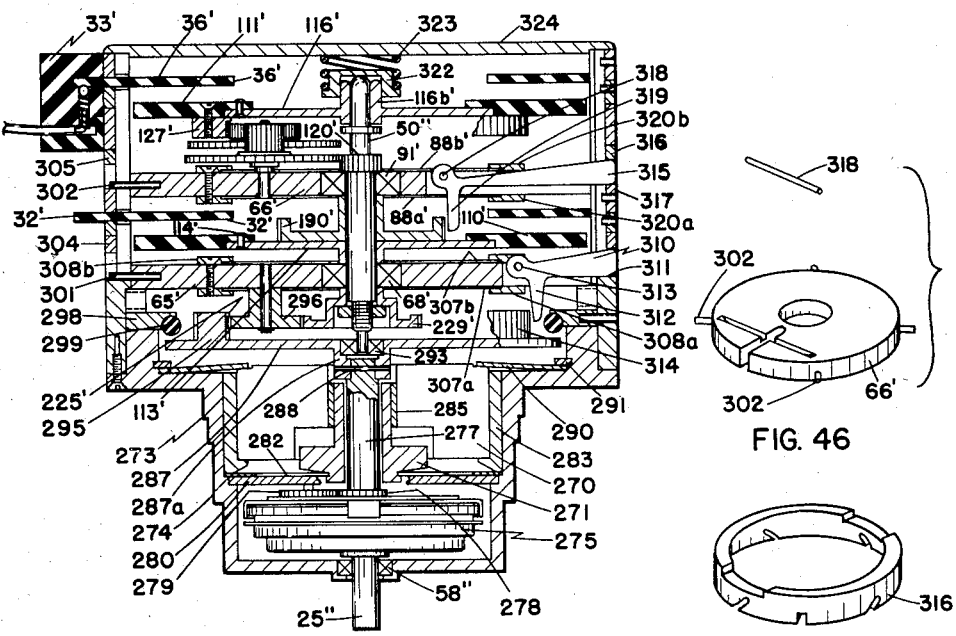
FIG. 45
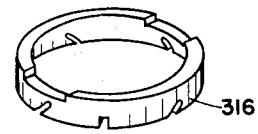
FIG. 46
FIG. 47
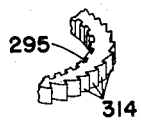
FIG. 49
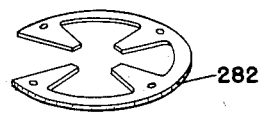
FIG. 48
INVENTOR.
GEORGE H. LEONARD
BY
John C. Dorfman
ATTORNEY United States Patent Office 2,869,782
Patented Jan. 20, 1959

2,869,782

MECHANICAL COUNTER NUMERAL WHEEL RECTIFYING APPARATUS

George H. Leonard, Darien, Conn.

Application June 21, 1954, Serial No. 437,991

31 Claims. (Cl. 235—1)

This invention concerns improved mechanical counters of the rotatable shaft variety. More specifically, this invention concerns a mechanical counter which has a rotatable counter member mounted to rotate relative to a frame so that successive counts are indicated by successive positions of the rotatable member relative to the frame. This invention offers a different solution to problems solved by my earlier invention in the art of mechanical counters as treated in my United States patent application Serial No. 339,269, filed February 27, 1953, now Patent No. 2,781,172.

It is often desirable to count the movements of a device or number of operations which said device performs. Because of their relative reliability, ruggedness and long life expectancy, mechanical counters are highly desirable for such purposes. However, for most high speed counting applications mechanical counters have been largely ruled out because of their structural components, which are unable to withstand the high rates of speed involved.

Electronic counters have become common for applications involving high speed counting. Such electronic counters have a large capacity and an almost unlimited rate of storage which may be quickly and accurately read or which may be recorded or "remembered" by the counter. However, electronic counters tend to be rather bulky because of the number of tubes and components required for each operation of the counter. Even very simple counters with a relatively large capacity usually involve several chasses the equipment quickly becomes bulky. Furthermore, although electronic equipment has become much more reliable than it used to be, it is still much more subject to failure than relatively simpler mechanical equipment, and the repair of said electronic equipment often requires a great deal of time and effort on the part of a skilled tradesman. Moreover, electronic counters for the same type counting for which the present invention is adapted require rotating contactors and direction sensing mechanism, and hence are especially elaborate and difficult to maintain. Finally, an electronic counter's adding is cumulative (i. e., step by step) so that a mistake at any particular stage is never corrected.

The present invention concerns a mechanical counter which, like many other types of mechanical counters, is reliable, rugged, and has a long life expectancy. Said mechanical counter can be made to have an almost unlimited storage capacity. It is able to operate under circumstances requiring subtraction as well as addition to the count. It is able to render an accurate count reading quickly. In addition, it has a higher rate of storage than prior mechanical counters, which high storage rate makes it useful in areas heretofore preempted by electronic counters. Its light weight and simple and compact structure occupies relatively little space compared to an electronic counter.

This novel counter is advantageously driven by the device (hereafter called the counter drive "or" drive) whose movements are to be counted. For instance, the counter may be gear driven by coupling it to some rotating part of the drive. When driven in one direction, the counter adds, and, when driven in the opposite direction, it subtracts. The counter's power input drive shaft may be mounted on frictionless bearings so that extremely high rotational speeds at the input shaft, in the order of 10,000 R. P. M. and higher, are permitted. Such a speed, theoretically, at least, will permit the storage of 5,120,000 counts per minute using a three stage binary version of the preferred form of the counter with the preferred lost motion device. The counter has stationary and rotational members between which no permanent contact, other than at the bearings, need be made. And, if such contact is made at other points, it may be of such a nature as neither to impair the potential speed of the counter nor to prevent the reversing of the counter.

A rotatable member mounted on a reference frame provides a simple version of this counter. As it rotates, all of the various points on the rotatable member successively appear opposite any given point on the stationary frame. If the rotatable counter member is always viewed from the same position on the frame, the rotatable counter member may be calibrated so that successive portions of the counter member passing this viewing position on the frame represent consecutive numbers and such calibrations might well be observed visually, for example, by a viewer mechanism on the frame. In the alternative, or in combination with such calibrations, cooperating portions of the frame and counter member may be provided so that for each angular position of the counter member relative to the frame, there is a different combination of the cooperating portions which is distinguishable from the combination in each of the other positions.

There is a practical limit to the number of units which may be counted by a single rotatable member, which limit is determined by a variety of factors, such as tolerance and clearances and the nature of the cooperation portions of the stationary and rotatable members. If greater capacity is required of a counter for a particular application, more than one rotatable counter member may be employed. When a plurality of counter members are employed, they are coupled together, as by gears, to rotate at speeds in a particular ratio. The slower counter members then become "storage members" inasmuch as a part of a revolution of a slower counter member records a full revolution of a faster counter member. Thus, if the faster counter member rotates "$r$" times faster than the slower counter member, the slower counter member is able to record "$r$" full revolutions of the faster counter member and moves only $1/r$ revolution in a full revolution of the faster counter member. It is, therefore, possible to calibrate the slower counter member every $1/r$ revolution to represent the number of revolutions from zero to "$r$" made by the faster member. Successively slower counter members may be made to record the number of revolutions made by the next faster counter member in a similar manner.

If a single stage counter (i. e., one with one counter member) or the fastest counter member in a multi-stage counter is to have a count capacity of "$n$" consecutive numbers, the centers of adjacent calibrations will be separated $1/n$ revolution or $360/n$ degrees of rotation from one another. It will be appreciated that "$n$" corresponds to "$r$," as previously defined, except that, since it is the first and fastest or the only rotatable counter member, no ratio of speeds is necessarily the determining factor of the value of "$n$." In fact, "$n$" may be arbitrarily selected for any particular counter, leaving the mechanic to choose the proper coupling for interconnecting the counter drive and the counter.

Accurate readings are essential to a counter whether mechanical or electronic. One of the most frequent causes of inaccuracy in mechanical counters of the type under discussion is the tendency for the rotatable counter member to stop between two of its adjacent discrete "read out" positions. Such a situation may be described as yielding an ambiguous reading and the problem will hereafter be referred to as "ambiguity."

Ambiguity has been reduced in the prior art by providing a snap action which advances the position of the rotatable counter member a whole calibration at a time. That is, in the case of the first counter member, it moves $360/n$ revolution at a time, and, in the case of later counter members, each of them moves $360/r$ revolution at a time. By the use of a counter employing a Geneva system, or other systems providing a like result, ambiguity may be reduced. However, such systems have high inertia by their very nature, and, when introduced into a mechanical counter's counting system, they so severely increase its inertia that its speed of operation is materially limited.

My earlier invention described in my co-pending application Serial No. 339,269, now Patent No. 2,781,172, previously referred to, concerned a freely rotatable counter system in which ambiguity was avoided by the movement of members mounted on the frame rather than in the rotatable counter system. In this manner ambiguity may be avoided and highly accurate readings be obtained. The main advantages of the present invention over the structure of my earlier invention are greater compactness, elimination of many springs, improved detenting action, elimination of the necessity for flexing wires, elimination of contact "hang up" in hills and valleys, and inclusion of a lost motion device.

The present invention, like my earlier invention, concerns a smooth running rotatable counter system. In this instance, however, ambiguity is resolved by a rectifying rotation of the separate counter members of the counter system. Each of the counter members is coupled to a rectification rotor, which has nothing to do with the counting rotation of the counter. However, upon actuation, the rotor merely produces a small amount of rectifying rotation on the part of the counter member to which it is connected to rotate said counter member to one of its discrete read-out positions. When the counter is effectively stopped to take a reading, the counter members, of course, rarely ever stop exactly in their discrete read-out positions. Consequently, rectifying rotation is necessary to achieve such position. It does so rapidly and to a high degree of accuracy. Moreover, final selection of the proper read-out position is done in the order of speed of the rotatable counter members, the fastest to the slowest, so that the reading of each successive counter member will be accurate in terms of the accurate position of its next faster member.

The mechanical counter of the present invention consists of at least one rotatable counter member mounted relative to a reference frame such that the angular position of the counter member on its axis relative to the frame indicates a count. Means is provided between the frame and the counter member to stop the counting rotation and separate means is provided for producing rectifying rotation of the counter member to its read-out position. Means is also provided for stopping the counter member in the course of its rectifying rotation at the proper one of its discrete read-out positions.

The frame in the present invention is advantageously composed at least in part of an annular housing composed of coaxially stacked annular members. Within the annular housing a rotatable shaft is axially located relative to the annular side walls. This shaft is held in its axial alignment by at least a pair of supports, at least one of which consists of a radially extending co-axially arranged disc-like member, or rotor, which is bearing coupled at its center to the shaft to permit rotation of the shaft (particularly, counting rotation) relative to the rotor and yet cause the rotor to move axially with the shaft. The outside of the rotor cooperates with the annular side walls of the housing to hold the alignment of the shaft and to permit slight rotational movement of the rotor. Depending on whether there are one or more stages to the counter, there will be one or more rotors. If there is just one rotor, the other axially aligning member advantageously is a deep cup bearing which engages the end of the shaft in a close journal fit but permits axial movement of the shaft. If, on the other hand, there are two rotors, the deep cup bearing is unnecessary inasmuch as two rotors will be sufficient to preserve axial alignment.

In addition to the bearing support the shaft, and preferably one end thereof, is connected to a member which is axially movable and hence makes the shaft axially movable, relative to the housing. The supports for the shaft are of such a nature that they will permit axial "actuating" movement of the shaft in an axial direction which movement, as will later appear, permits reading of the counter. It is this axial actuating movement that produces rectifying rotation of the rotors, and rectifying rotation of the rotors is the motor force producing the action which stops the various counter members in their discrete positions. The axial movement of the shaft may be initiated through a solenoid or any other actuating means, and it may be supplied by a variety of coupling means which will occur to one skilled in the art.

The rotatable counter members themselves may or may not be attached to the counter shaft but they are advantageously made to rotate about the shaft and are mounted on and supported by the shaft. Whether or not the counter members are coupled to rotate with the shaft, they are coupled together to rotate relative to the frame at a predetermined rate relative to one another. The over-all rotating system which produces the counting, as contrasted with the rectifying rotation, constitutes the counter system. There may be any number of counter members, all of which are coupled together to rotate at speeds proportional to one another, but all of the members beyond the second stage will operate in essentially the same way as the rotatable counter member and rotor of the second stage, and, therefore, need not be described. Accordingly, in the specific description of the invention, only a two stage counter will be considered, it being clearly understood that an indefinite number of stages may be added.

If the faster counter member rotates "$r$" times faster than the slower member, the slower member will have "$r$" discrete positions spaced $1/r$ revolution or $360/r$ degrees apart, each position representing exactly an integral number of complete revolutions of the faster member. Then it will be necessary for the means producing rectifying rotation of the slower member to cause it to move through at least $1/r$ revolution. The means usually includes one of the rotors, preferably gear coupled to the counter member, the rectifying rotation being produced by rotation of the rotor as the shaft is moved axially. Means is also provided to stop the rectifying rotation at one of the discrete read-out positions of the counter member. This means, at least in the slower stages, includes in the counter system a cam which cooperates with the means producing the rectifying rotation in order to stop the rectifying rotation.

The cam member which cooperates to stop the rectifying rotation in one version of the counter is mated with a cam follower on a slide member, in which case it is the action of the slide which actually stops rectifying rotation. Such a slide member is provided with guides adapted to slide in slots in the annular housing. The guides in the slots keep movement of the slide in a plane parallel to the axis of the shaft. This slide is also coupled to the rotor in such a way that it moves as the rotor moves and the rotor will not move if it does not move.

The cooperation between the slide and the rotor may occur between shoulders on the rotor and portions of the slide which abut said shoulders. Thus, as the rectification rotor is moved, the slide of necessity is moved until the cam follower on the slide contacts the cam. Thereafter, the slide can move no further in the direction it has been moving. Since the slide can no longer move, the rotor can no longer move and the counter member to which the rotor is coupled can no longer move.

In all versions of the counter, the structural parts are so arranged that when the rotor is fixed, the slower counter member is fixed in one of the discrete positions. In order to avoid breakage, the rotor is resiliently coupled to the shaft so that the shaft may continue to move axially while the rotor is held by the slide against further rotation and axial movement. This resilient coupling between shaft and rotor may take the form of a compressible spring member between shoulders on the rotor and the shaft, respectively. The relatively moveable parts are supplied opposed smooth cylindrical surfaces permitting their relative movement in an axial direction.

When but a single rotatable counter member is employed, or in the first stage of a counter, location of the proper discrete position can be accomplished by a variety of means whereby braking is combined with positioning. Braking is accomplished by introducing some member between the rotatable counter member and the frame. In the preferred form of the present invention it is accomplished by use of a detent member which meshes with a saw tooth wheel on the fastest counter member. The detent seeks one of the "n" valley positions in the saw tooth wheel. The resulting movement causes the counter member to seek one of its "n" discrete read-out positions. The detent is preferably actuated by a mechanism employing a rotor member wherein the detent is mounted on a slide. This slide is arranged in slots in the housing to move only in a plane, which movement directs the detent toward the saw tooth wheel. A resilient coupling between the slide and the rotor urges the slide toward the saw tooth wheel, but a shoulder on the rotor resists movement of a portion of the slide which bears against said shoulder. The rotor itself moves, thereby permitting movement of the slide and the detent toward the saw tooth wheel.

Read-out or recording of the count in the present invention can be accomplished in a variety of ways. One of the preferred ways is to employ circuitry, preferably printed circuitry, with a plurality of circuit combinations and a plurality of terminals so that the count is determined by signals appearing at different combinations of terminals. One preferred way of doing this is to have separate contact areas connected to each of the terminals on a stationary member and connective circuits on the rotatable counter member with contacts for cooperating with the contact areas on the stationary member. Use of the printed circuit and terminal members makes it unnecessary to use flexing wire members. Instead, spring loaded ball contact members may be supplied between the circuitry on the stationary and the rotatable counter members. Likewise, such contacts may be employed in plug members cooperating with the terminals on the stationary member which is part of the frame.

A particular area in which mechanical counters have rarely been considered is that area in which it is necessary to take frequent quick readings while the device providing the counter drive is running so that the equipment being observed by the counter will not have to be shut down. Electronic counters in such a situation have had the advantage of being able to take a running count that can be read at any time and the readings of which can be readily stored.

In accordance with the present invention a means is provided by which counts may be taken with a mechanical counter at frequent intervals without disturbing the operation of the equipment. Using this device, the counter of the present invention can quickly make a reading which may, by producing an electrical or other signal, be recorded, stored and/or immediately read, as desired. This means is a novel lost motion device which makes possible read-out of the counter invention despite the continuation of high speed counting. This lost motion device is co-axial and essentially symmetrical about the axis. It is compact and normally holds the counter system exactly in synchronism with the counter drive from which the count is being taken. However, as the counter is stopped in order to take a reading, the lost motion device immediately responds and permits the counter drive to continue to rotate though the counter system is effectively stopped. After the counter reading has been taken, the lost motion device causes the counter to catch up with the drive and quickly restores the counter to in-phase rotation. The lost motion device makes it possible to use the detent braking method. Without the lost motion device such braking might destroy the mechanism. In addition to the above described functions, the lost motion device may be used as a speed reduction device in order to reduce the inertia of its own parts.

The counter of the present invention is small and compact. Consequently, it will be useful in a great number of applications where conservation of space is important. Moreover, it is extremely rugged, being composed of rugged parts accurately fitted together. It employs relatively few springs and what springs are employed are extremely rugged. It employs relatively few parts, which are easily manufactured for the most part and which may be relatively easily assembled and aligned relative to one another.

The versatility of the present invention coupled with its convertibility makes the present invention useful in many applications. For instance, the structure of the present invention permits adjustment of the relative speeds of the counter members by rearrangement of a few parts. By substituting a few interchangeable parts the system of counting may be completely altered (e. g. from decimal to binary). Thus, a relatively large number of relative rotational speeds and count capacities are obtainable by using just a few interchangeable parts in a structure consisting largely of standard parts. The interchangeable parts serve to do one of several things, to wit: change relative speeds of counting rotation, change the counting system or code, and change related circuitry to obtain different effects with the same code. Generally speaking, the different speeds require different codes which also require different circuitry on the rotatable and/or stationary members. In accordance with the invention, the circuitry for a given code is capable of being made in such a manner that a variety of contact patterns is obtainable by simply punching out holes in a printed circuit.

Finally, the present invention constitutes a very small load to the counter drive. It is extremely effective and fast acting so that it may be used even in applications requiring high speed counting. The counter may be made so that it will be operatable either forward or in reverse, to add or subtract, and two counters may be operated in combination through only one input shaft. Moreover, a variety of input shafts may be employed, connection to different ones of which will produce a variety of different useful results.

For a better understanding of the present invention, reference is made to the following drawings:

Fig. 16a is a detailed fragmentary plan view from above showing the ball-in-groove means of mounting the rotor relative to the annular frame portion.

Fig. 16b is a sectional view along line b—b in Fig. 16a.

Figures 22, 23:
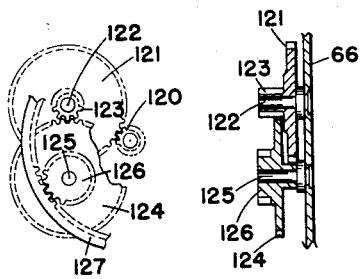

Fig. 22 schematically illustrates the gear connections between the faster (affixed to the shaft) and the slower counter members.

Fig. 23 is a sectional view of the stud supported gears of the structure of Fig. 22.

Figure 24:
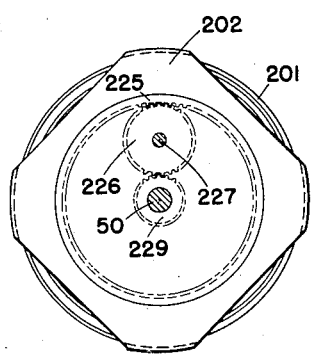

Fig. 24 is a plan view from above showing the lost-motion device from the counter side of said device.

Figure 25:
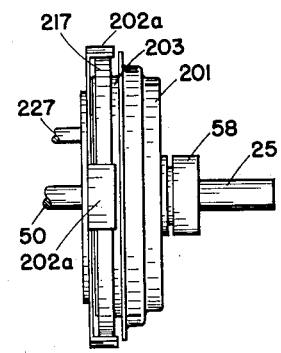

Fig. 25 is a side elevational view of the device of Fig. 24 showing the relative locations of the counter and drive shafts.

Figure 26:
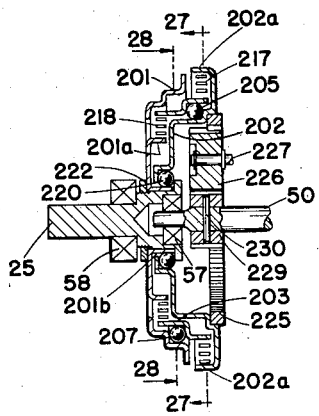

Fig. 26 is a sectional view of the structure of Figs. 24–25 in vertical section.

Figure 27:
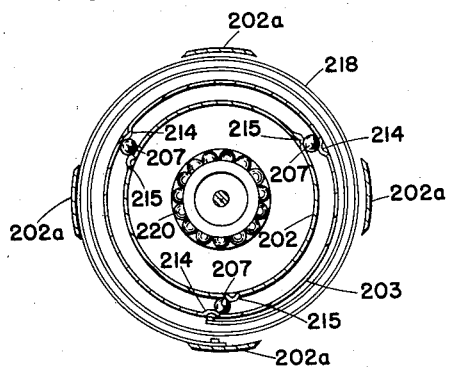

Fig. 27 is a sectional view along line 27—27 in Fig. 26.

Figure 28:
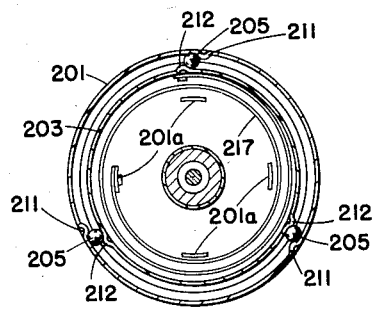

Fig. 28 is a sectional view along line 28—28 in Fig. 26.

Figure 29:
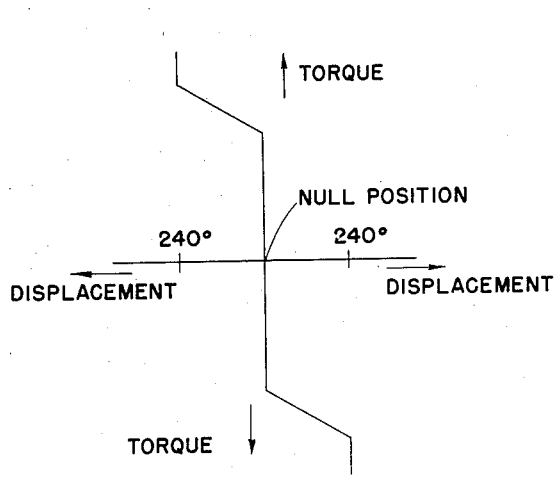

Fig. 29 is a graph of torque against displacement as applied to the lost motion device illustrated in Figs. 24–28.

Figures 30A, 30B:
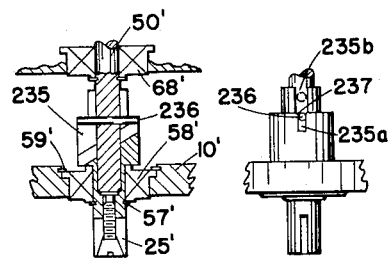

Fig. 30a shows in vertical section a form of coupling alternative to the lost motion device shown in Figs. 24–29.

Fig. 30b shows the device of Fig. 30a in a side elevational view rotated 90° from Fig. 30a.

Figure 31:
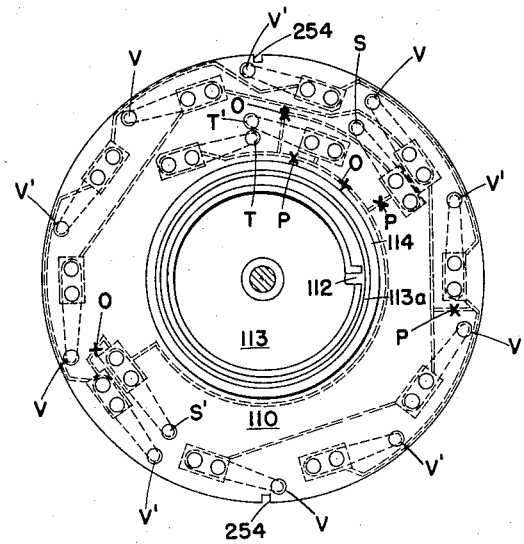

Fig. 31 illustrates the faster counter member showing its connective printed circuit and contact members.

Figures 32, 33, 34:
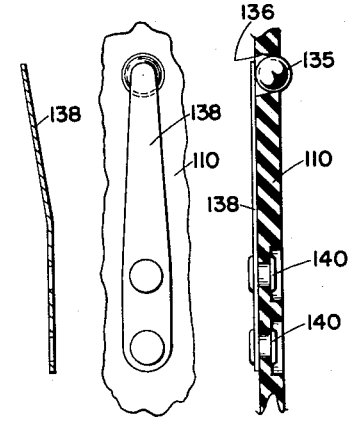

Fig. 32 is a sectional view of a spring used with a contact member.

Fig. 33 is a plan view from above of the spring member of Fig. 32 mounted on the circuit and holding a ball contact number in place.

Fig. 34 is a sectional view of the structure shown in Fig. 33.

Figures 35, 40:
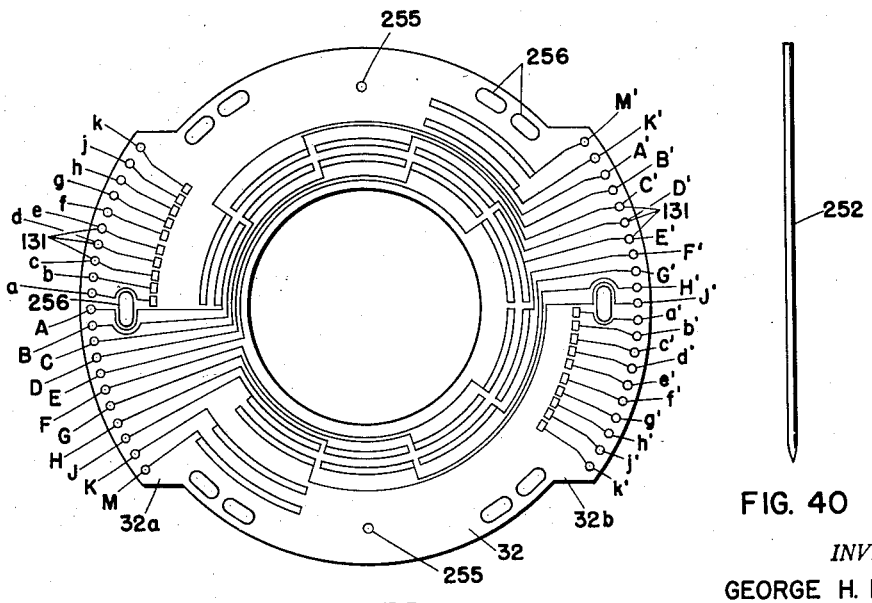

Fig. 35 is an illustration of the circuit of the stationary reference member on the frame of the counter device in a plan view from below.

Figure 36:
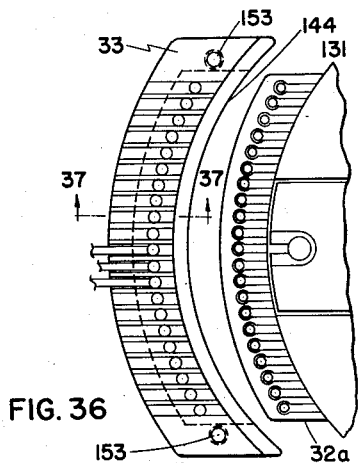

Fig. 36 illustrates the terminals on one of the stationary reference members and a cooperating plug in a plan view showing the plug without its top cover in place.

Figure 37:
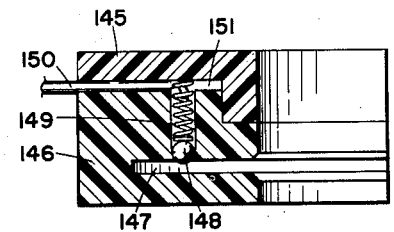

Fig. 37 is a sectional view of the plug of Fig. 36 without the stationary circuit in place.

Figure 38:
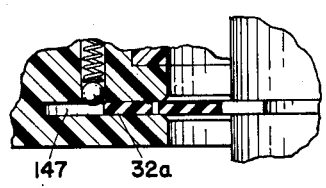

Fig. 38 in sectional view illustrates the reference member being inserted into the plug.

Figure 39:
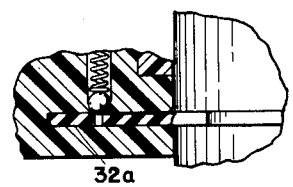

Fig. 39 in a sectional view similar to that of Fig. 38 illustrates how the plug makes contact with the terminals.

Fig. 40 illustrates an alignment rod.

Figure 41:
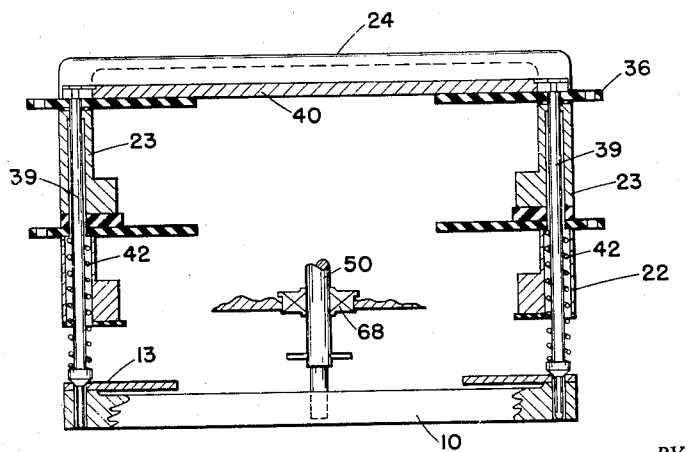

Fig. 41 illustrates in vertical section part of the counter and, in particular, the actuating mechanism for initiating rectifying rotation.

Figures 42, 43:
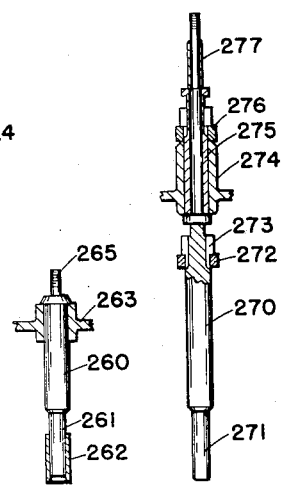

Fig. 42 illustrates in partial section a shaft construction which may be employed with a one-stage counter.

Fig. 43 illustrates in partial section a shaft construction which may be employed with a three stage counter.

Fig. 44 illustrates graphically the various stages encountered between the counting and read-out positions of the counter members in the course of rectifying rotation.

Fig. 45 illustrates in vertical section a modified two stage version of the counter structure.

Fig. 46 shows in perspective the rotor member which is employed in the structure of Fig. 45.

Fig. 47 illustrates in perspective an annular housing member which is employed in the structure of Fig. 45.

Fig. 48 is a spider spring member, several of which are used in the structure of Fig. 45 to provide yield or return spring action to the axial counter shaft.

Fig. 49 is a ring gear-cam combination used in the slower stage of the counter of Fig. 45.

Figure 50A:
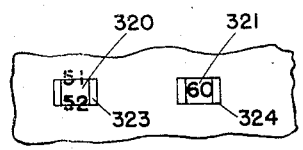

Fig. 50a shows a dial type counter illustrating the problem of ambiguity.

Figure 50B:
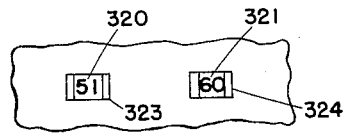

Fig. 50b shows the results of rectification in this dial type counter.

Figure 1:
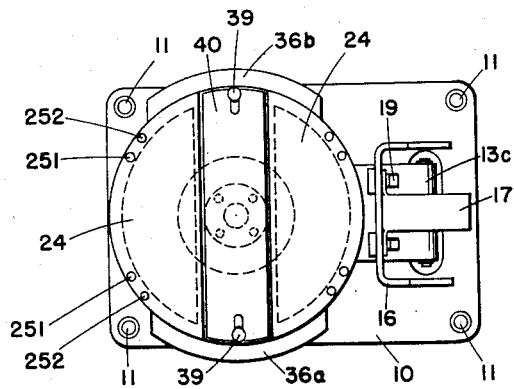
Fig. 1 is a plan view from above of a preferred version of the mechanical counter of the present invention.
Figure 7:
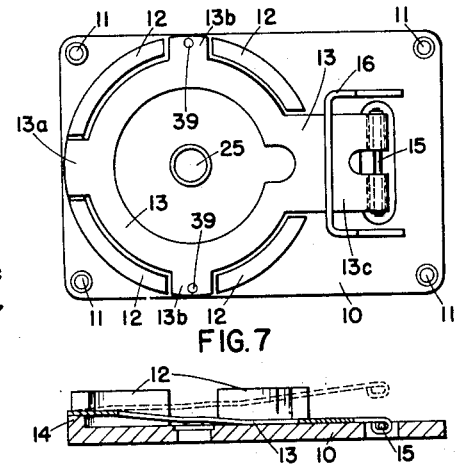
Fig. 7 is a plan view from above of the base of the counter showing the actuating lever in place.
Figure 6:
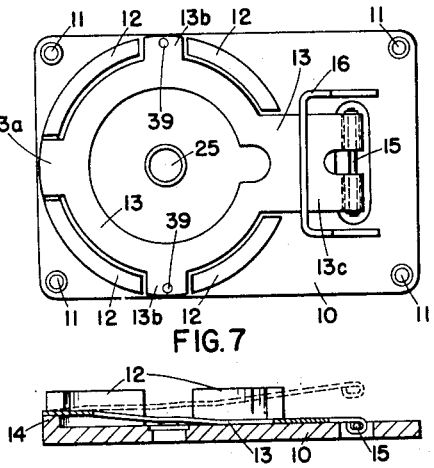
Fig. 6 is a sectional view of the base showing the actuating lever and its operation.

Referring to Figs. 1–6, the preferred form of the novel counter is illustrated in such a way as to give an overall impression of the arrangement of the various portions of the frame of the counter. The base of the counter illustrated in Figs. 5–7 consists of a plate having mounting holes 11 at its corners. The plate 10 is generally rectangular in shape. The longer sides are arbitrarily selected as the "sides" of the rectangular base and the shorter sides thereof as the "ends." Four arcuate flange members 12 are arranged in a circular or tubular form with spaces between the adjacent ones of them left to accommodate various protrusions of lever member 13. Lever 13 has a generally annular portion arranged within the circle defined by flanges 12. A radial protrusion 13a rests upon a tubular web 14 (see Fig. 8) which provides a fulcrum for the lever. Flanges 13b are diametrically arranged on opposite sides of the lever 13. Flanges 13b transfer the lifting force of the lever arm to the actuating mechanism to produce rectifying rotation. Arm 13c is the part of the lever 13 to which force is applied through pin 15 which is engaged by the tubular portion at the bifurcated end of arm 13c.

Solenoid bracket 16 is arranged to support the solenoid coil 17. One end of the solenoid core 18 supports pin 15 and hence is connected to the lever arm 13c. Thus, as the solenoid core 18 moves upward, lever arm 13 will be moved upward away from the base 10 guided by pins 39 in holes therein between tubular flanges 12. Solenoid winding 17 may be supported on bracket 16 by bolts or other suitable means extending through the mounting flange of the solenoid and particularly through the web of mounting flange 16.

In this version of the counter the frame plays a particularly important part because a portion of the frame serves as the readout or recording means. In most cases, this means which will hereafter be called the "stationary reference member," bears a stationary circuit which, in combination with the circuit of the rotatable counter member, produces a reading when in "readout" position. Generally speaking, the housing may be composed of a pair of cast annular bodies 22 and 23 and D-shaped castings which partially close one end of the housing. These housing members are arranged co-axially with the circular base portion formed by flanges 12 which also provides part of the housing. The input shaft 25 is co-axially aligned with the housing members. Between members 22 and 12 is interposed a ring stop member 27. Between annular housing members 22 and 23 is located the dielectric stationary reference member 32 and insulating washer 29 which insulates the circuitry on stationary reference member 32 from housing member 22. Stop member 30 adjacent to member 23 protects stationary member 32 which it also borders.

Figure 2:
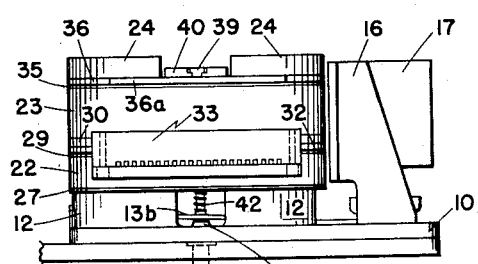
Fig. 2 is a side elevational view of the same counter.
Figure 4:
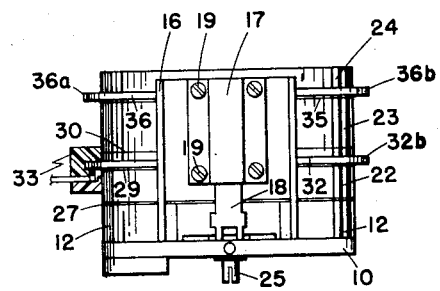
Fig. 4 is an elevational view of the counter from the end at which the solenoid is mounted.

Stationary member 32 is preferably a dielectric member, such as a plastic laminate, having a printed circuit on one of its surfaces (in this case, the bottom surface) and having terminal flanges 32a and 32b extending from opposite sides of the annular housing. Special plug members generally designated 33 are designed to engage these terminal flanges. In Figs. 2 and 4, such a plug is shown engaging terminal flange 32a.

Between members 24 and annular member 23 are insulating washer 35 and stationary reference member 36, corresponding to member 32, having terminal flanges 36a and 36b.

Extending through flanges 13b and upward through the annular housing members 22 and 23 are rod-like members 39. Each of these rod-like members is loosely engaged at one end by one of the flanges 13b of lever 13 and is affixed at the other end to one end of strap 40. Strap 40 extends diametrically across the end of the counter between the D-shaped housing members 24. As will later be described, strap 40 is coupled to the counter shaft and produces axial movement thereof. Axial movement of strap 40 is accomplished through movement of rods 39. Rods 39 are loosely fitted into the flanges 13b. These rods pass through slots in the housing and are snugly accommodated at each end in reduced diameter portions of the slot in members 10 and 23 in order to preserve their alignment parallel to the axis of the structure. Spring members 42 bear against the housing at one end and against radially extending shoulders 39a of the respective rod members or directly on the flanges 13b in order to urge the rods and the supported strap 40 and shaft back into counting position.

Figure 3:
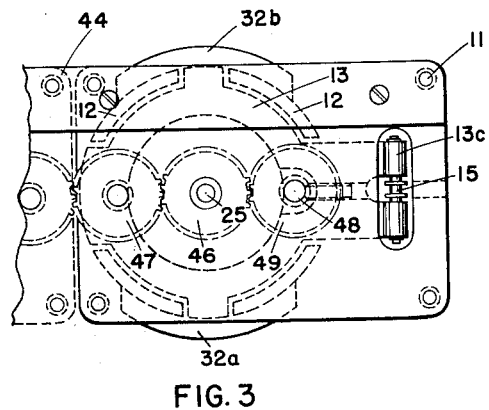
Fig. 3 is a bottom view of the same counter showing how one counter may be coupled to another in order to drive the second counter in reverse.
Figure 5:
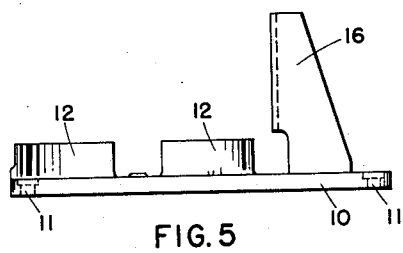
Fig. 5 illustrates in elevation, the mounting base for the frame of the counter illustrating also the mounting bracket for the solenoid.

Two counters may be connected together using a connecting bar member 44 as may be seen in Fig. 3. Such interconnected counters are preferably arranged with gear connections such that one counter may drive another, as through gears 46 and 47, and the two corresponding gears on the adjacent counter. The adjacent counter will, of course, be driven in a direction opposite to that of the directly driven counter. If desired, however, a counter may be directly driven in the reverse direction from the direct coupled direction by coupling the drive to input connection 48 so that gear 46 will drive normal input connection 25 in reverse through gear 49 which is in mesh with gear 46.

Figure 8:
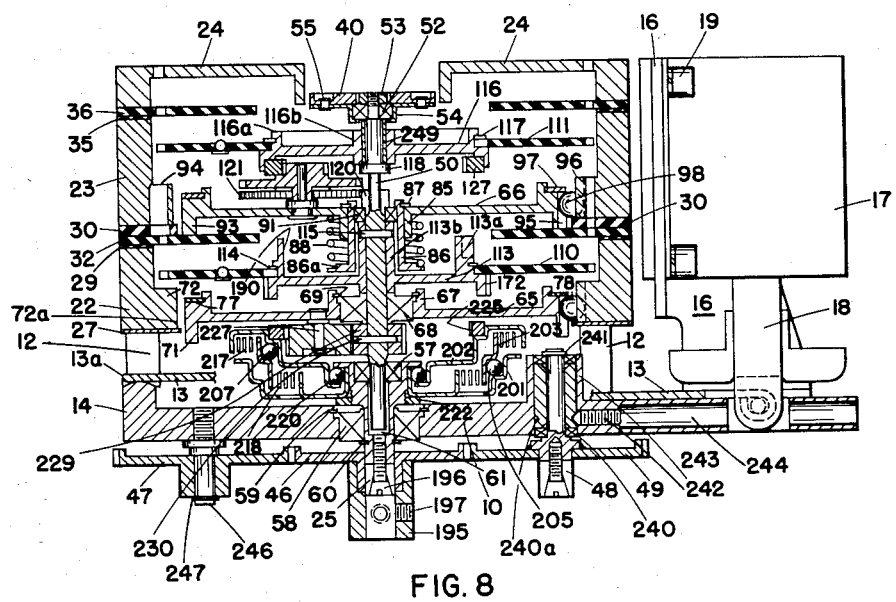
Fig. 8 is a vertical sectional view of a two stage preferred version of the counter of the present invention in counting position showing the solenoid in elevation.
Figure 9:
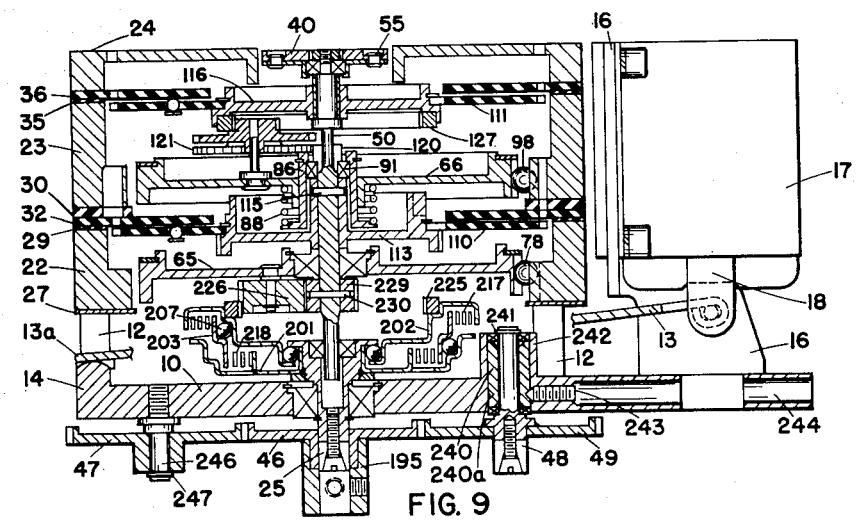
Fig. 9 is a sectional view similar to Fig. 8 showing the solenoid in fully actuated position and the counter in read-out position.
Figure 10:
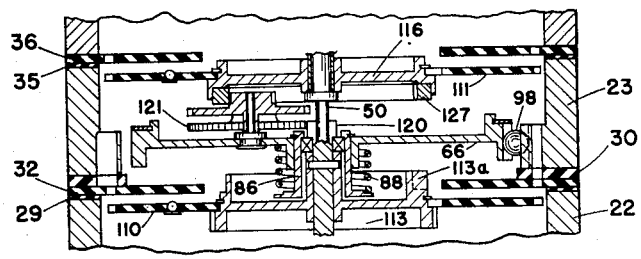
Fig. 10 is a fragmentary sectional view corresponding to the sectional views shown in Figs. 8 and 9, showing an intermediate position of the counter during the rectifying rotation.
Figure 13:
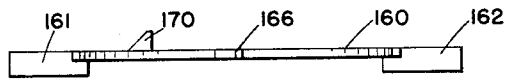
Fig. 13 is a side elevational view of the slide member shown in Fig. 12.

The rotatable parts of the counter system are located within the annular housing portion furnished largely by the side wall members 12, 23, and 24 and end wall members 24 and 10, as may be seen in Figs. 8-10. The rotational system is centered about a shaft 50, which is axially located with respect to the annular housing. Shaft 50 is supported on strap 40 through bearing 52 which is arranged to permit rotation of the shaft 50 relative to the strap 40. Bearing 52 is advantageously a ball bearing or some other frictionless type of bearing. If a ball bearing is used, the inner race thereof may be fixed to the shaft against a shoulder adjacent to one end and held in place by a nut 53 which is engaged by the threaded end of the shaft 50. The outer race of bearing 52 may be supported by an annular bracket 54 fixed in place by rivets 55, or other suitable means. Rivets 55 may be arranged in depressions in the strap 40 so that their heads do not protrude above the strap.

The other end of the shaft 50 is advantageously a straight cylindrical surface which is slidably engaged by the inner race of ball bearing 57. The outer race of bearing 57 is advantageously supported and affixed on the input shaft 25. Input shaft 25 is itself supported on a bearing structure 58 which is preferably of some frictionless type. The outer race of the bearing structure 58 is held in place in an aperture through base 10 against a shoulder in said aperture. A snap ring 59 is engaged in an annular circumferential groove in the aperture in base 10 above the outer race of bearing 58 in order to hold said outer race against the shoulder. The input shaft is arranged with a shoulder internal of the housing against which the inner race abuts so that the inner race may be held in place by using the snap ring 60 engaged in annular circumferential groove in the input shaft as illustrated.

The interior of the input shaft 25 is bored to form an axial hole 61 for clearance for the end of shaft 50 where it extends beyond bearing 57.

The two bearings for the shaft previously described do not serve to center the shaft, and, since it is essential that the shaft be centered, this centering function must be performed by other members. These members are the so-called "rotors" which extend between the shaft and the annular inside side walls of the housing. The rotors 65 and 66 may be variously coupled to the shaft and to the side walls. Rotor 65, for instance, has a hub flange 67 of generally tubular form which is advantageously designed with a shoulder to engage a shoulder on the outer race of bearing member 68. Snap ring 69 is inserted in an annular circumferential groove in hub flange 67 to hold the shoulder of the outer race of bearing 68 in place against the shoulder of the hub. The inner race of bearing 68 is held in place between its adjacent members which are pinned to the axial shaft so that said inner race can not shift axially from its initial position.

The outer edge of rotor 65 is provided with a heavy tubular rim 71 which has a cylindrical outer surface concentric with a cylindrical surface 72a on an inwardly extending flange 72 on annular housing member 22. As may be seen in greater detail by reference to Fig. 12 and Figs. 16a, 16b, 16c, and 16d, in the preferred construction, opposed diagonal grooves 74 and 75 are cut in the opposed surfaces of rim 71 and flange 72. The grooves 74 and 75 may be cut the whole axial length of the respective faces in which they lie in order to facilitate their fabrication. In the position shown the upper end of groove 74 is closed by snap ring 77 which is engaged in an annular circumferential groove in rim 71, which is recessed and cut back at its upper edge in order to facilitate introduction of snap ring 77. The opposite end or bottom end of groove 75 is closed by stop ring 27, previously described. The ball 78 is snugly engaged in grooves 74 and 75 but is free to run the length of the grooves, as will be described later. There are three such ball and slot arrangements, preferably equally spaced around the periphery of the rotor. Three point contacts supplied by the balls define a plane, which is normal to the shaft and axis of rotation. In annular flange 72 on housing member 22 and behind one of the grooves 75 is cut a circumferential groove 81 which is joined to a radial cut 82 which extends inwardly through the surface 72a. Thus, a cantalever portion 83 of flange 72 is formed. Extending through the annular body portion 22 in a radial direction toward the cantalever portion 83 is a screw 84 or other adjustable means which bears against cantalever portion 83 on its face that borders on groove 81. Inward movement of adjustable member 84 will produce an inward movement of cantalever 83. As cantalever portion 83 is driven inward, so also is the ball 78 which its slot holds. By this mechanism it is possible to remove any play from between the rotor 65 and the annular housing member 22 which occurs because of clearances or tolerances in the ball and groove structure as described. This method does not harm the planar positioning of the rotor.

Rotor 66 is similar in most respects to rotor 65, except that its hub flange 85 is not connected directly to the bearing permitting rotation between the rotor 66 and the shaft 50. In fact, hub flange 85 is provided with a smooth cylindrical inner surface which is slidably engaged by an opposed cylindrical surface on tubular member 86. Movement of rotor 66 in the upward direction, in the sense shown by the arrangement of Fig. 8, is limited by a shoulder formed by snap ring 87 which is engaged in an annular slot in tubular member 86. At the other end of tubular member 86 is an outwardly extending radial flange 86a which is arranged to support a relatively stiff coil spring 88 which extends between flange 86a and rotor 66 and urges rotor 66 against the stop or shoulder provided by snap ring 87. Thus, relative axial movement is permissible between hub flange 85 and tubular member 86 opposing the urging of the spring in order to compress the spring. Tubular member 86 is affixed to the outer race of bearing 91 which extends between tubular member 86 and shaft 50. Tubular member 86 is held in place relative to the shaft 50 by the bearing 91 which permits its relative rotation between tubular member 86 and shaft 50. Since the outer race of the bearing is fixed to tubular member 86 relative axial motion therebetween is prevented. The inner trace of bearing 91 is held in place on shaft 50 by virtue of its positioning between other members which are axially fixed in place relative to the shaft.

Figure 18:
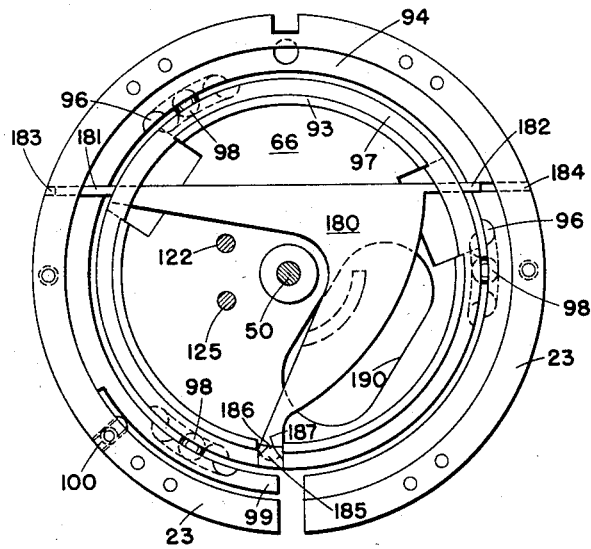
Fig. 18 is a plan view from above showing the slide member of Fig. 17 in place on the rotor.
Figure 19:
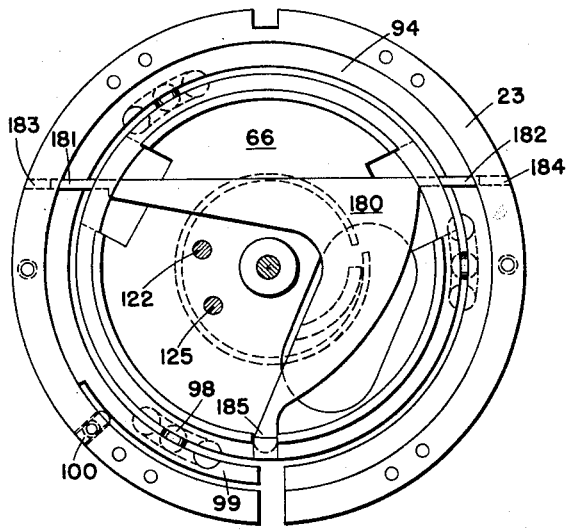
Fig. 19 is a view corresponding to Fig. 18 showing the slide overshifted due to rotor rotation and the cam member on the slide in contact with the cam (shown in phantom).

The rim 93 of rotor 66 is provided with a cylindrical surface which opposes a cylindrical surface of annular housing member 23. Opposed diagonal slots 95 and 96 are formed in the opposed surfaces of members 93 and 94, respectively. The end of slot 94 is closed by snap ring 97 which is engaged by a circumferential annular groove. Rim 93 is cut back above the slot to more readily facilitate the introduction of snap ring 97. Annular stop 30 closes the opposite end of slot 96. Within each pair of the opposed slots is a ball 98. As in the case of rotor 65, these ball and groove members are advantageously arranged so that the three points at which they occur are approximately evenly spaced around the periphery of the rim. Reference to Figs. 18 and 19 will show the arrangement of the three balls. Again, as in the case of rotor 65, the cantalever portion 99 is provided by making the circumferential cut behind a ball carrying groove in annular flange 94. Radially directed means penetrating annular member 23 is again used to move the cantalever member inwardly as radial member 100 moves the cantalever portion 99 inwardly. Thus, the clearances and tolerances between the balls 98 and the grooves 95 and 96 are eliminated so that the rotor is confined to a definite plane and balls are prevented from shifting to change the limits of movement.

Establishment of two planes snugly supported by the side walls of the housing of the frame and, in turn, firmly supporting in place an axially aligned shaft provides exact centering of the shaft relative to the rotational system. If the shaft is precision made to close tolerances, all of the rotational system which is mounted on the shaft will also be very accurately centered. However, accurate arrangement of parts of the counter system and accurate alignment of both the rotational and stationary parts of the counter must also be accomplished in order to secure accurate counter operation.

Figure 20:
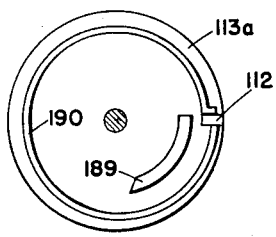
Fig. 20 is a view showing the cam member and the relative location of the cam follower of the slide during the counting.
Figure 21:
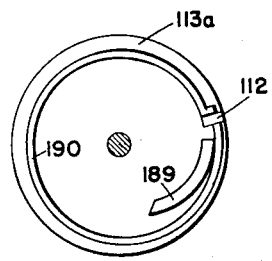
Fig. 21 is a schematic representation similar to Fig. 20 showing the cam follower in position against the cam in position to hold the slower counter member in read-out position.

The counter system comprises rotatable members which determine the positions of the rotatable counter members which, in turn, record the count. The counter system includes all coupling and driving connections which rotate in phase with the counter drive. In the two stage counter illustrated, there are just two rotatable counter members. These counter members 110 and 111 rotate about the shaft as an axis. In this particular case, counter member 110 is fixed to the shaft 50 to rotate in synchronism with it. In other versions of the invention, however, the shaft might be merely a mounting member which would probably also function as the center of rectifying rotation. The counter members, like other parts of the present invention, might differ considerably from one structure to another depending upon the method of obtaining readout, the arrangement of the rotatable counter members in the housing, etc. In this particular version of the counter, the rotatable counter member is an annular dielectric disc or sheet, such as one of the various types of laminates, upon which are printed various printed circuits which are arranged to cooperate with printed circuits mounted on the stationary reference member of the frame. The circuitry on rotatable counter member 110 is illustrated in Fig. 31 and will later be described in connection with Fig. 31. In this particular counter the rotatable counter member, disc 110, is affixed to the wheel 113 at its inner edge. The rotatable counter member's inner edge is snugly engaged by a cylindrical surface of rim 113a of the wheel, and the edge of its planar surface is held against a shoulder by a snap ring 114 which is engaged in an annular groove in rim 113a. Wheel 113 and disc 110 may be properly aligned relative to one another by a keying pin 112 which fits grooves in those two members and is held in place by snap ring 114 (see Figs. 20, 21 and 31). Wheel 113 has a tubular hub 113b at its center which snugly engages shaft 50 and is pinned thereto by pin member 115. Accordingly, whatever rotation is imparted to the shaft will also be imparted to rotatable counter member 110 through wheel 113.

Rotatable counter member 111 is fixed to wheel 116 against a shoulder on rim 116a, which rim snugly engages the inner edge of the counter member 111 and holds it in place by snap ring 117. A pin similar to pin 112 fits grooves in counter member 111 and wheel 116 thereby properly aligning said members and preventing their relative rotation. The hub 116b of wheel 116 fits sleeve 249 which, in turn, provides a journaled bearing to shaft 50 to permit relative rotation between the rotatable counter member 111 and shaft 50. Sleeve 249 is, however, fixed against axial motion by its position between shoulder 118 and the inner race of bearing 52. Actual drive of rotatable member 111 is accomplished through a gear system. Directly on the shaft 50 is pinion gear 120 which engages spur gear 121 (see Fig. 22). Spur gear 121 is mounted on stud 122 which is staked or press fitted into rotor 66. Also on stud 122, and integral with spur gear 121, is pinion 123. Pinion 123 engages spur gear 124 which is mounted on stud 125 which is also staked into rotor 66. Integral with spur gear 124 is pinion 126. Pinion 126 engages ring gear 127 which is mounted on wheel 116, preferably on rim portion 116a. Stud 125 is shown somewhat out of place in Figs. 8–10, and its proper location may be found by reference to Fig. 18.

Changes in the speed ratio between the shaft, and hence the faster rotatable counter member 110, and the slower rotatable counter member 111 may be accomplished using the same basic parts with a modification of stud positions and changes in spur and pinion gear ratios. Perhaps the most common ratio between the faster and the slower counter members is 100:1. It is possible, however, to have any desired ratio, such as the ratio 128:1 for a binary system or the ratio of 60:1 for a clock system. The particular arrangement illustrated and described is advantageous inasmuch as it requires no modification of the counter system to obtain any desired ratio. Of course, different calibrations, as well as different gear combinations will be required for different ratios selected. Where $r:1$ is the speed ratio of the faster to slower rotatable counter members, "$r$" may vary depending upon the system chosen.

As has been stated, it is the rotational or angular positions of the rotatable counter members with respect to the frame that determines the count represented by the counter. Various methods are available for indicating the positions of the counter members relative to the housing portions of the frame. The preferred method involves the use of circuitry elements on the rotatable counter members and the stationary reference members which circuitry elements for any given stage of the counter may be combined to produce different signal combinations for each of the discrete positions of the rotatable counter member. The preferred method of accomplishing this end is the use of cooperating printed circuit elements on both the stationary and rotatable counter members. The circuit elements on the stationary reference member preferably consist of a plurality of contact areas and conductive connection links between these areas and individual terminals for each area. The circuit elements on the rotatable counted member on the band preferably consists of a contact element for contacting the contact areas on the stationary member and connective circuitry connecting together various contact elements.

In order to understand the circuitry on the rotatable counter member (shown in Fig. 31), it is advisable to first consider the circuitry on the stationary reference member with which it cooperates. Decimal code circuitry for the stationary counter is illustrated in Fig. 35. As previously mentioned, the stationary counter member is preferably a thin dielectric member. It is of annular shape, having diametrically opposed radially outward extending flanges 32a and 32b, in this case. The entire circuitry illustrated is printed on only one planar surface of the stationary counter member. This circuitry consists of a plurality of conductive areas which are advantageous segments of circular bands. A separate terminal is connected to each of the conductive areas. These terminals are located on the flanges 32a and 32b, preferably in a single row along the outer periphery of each of the flanges. On each of the flanges there is a terminal which represents each possible digit, each digit being represented by a contact area. In the usual situation, as is the case here, two decimal places will be indicated by each stage of the counter so that each flange of each of the stationary members will have terminals for twenty possible digits, plus whatever other terminals are considered desirable. The digits on a given stationary member may be the units and tens digits or the hundreds and thousands digits or the ten thousands and hundred thousands digits, etc. For the sake of convenience, and since it is the circuitry on the stationary reference member 32 being described, the circuitry will represent units and tens digits. It will be understood that the same circuitry is advantageously employed on stationary reference member 36 to represent hundreds and thousands digits.

The contact areas connected to the terminals may be varied greatly in position but there are certain arrangements which are preferred because they lend themselves to ease of use with the rotatable counter member contacts. Of all the possible systems available for decimal type counters, the one illustrated in Fig. 35 is preferred. It will be observed that the contact areas occur at four radii in this preferred arrangement. At the outermost radius, there are twenty contact areas for the units digits. Each of these areas covers no more than $\frac{1}{100}$ revolution. It will be observed that half of the areas are adjacent terminal 32a and half of the areas are adjacent terminal 32b. Each area is arranged so that it is diametrically opposed to the area which represents the same units digits which it represents. Adjacent areas are spaced apart $\frac{1}{100}$ revolution on their centers. The ten digits are represented by 20 areas each covering approximately $\frac{1}{10}$ revolution. These larger areas are arranged so that nine of them are at a second radius smaller than that of the units digit areas and are spaced apart $\frac{1}{10}$ revolution on their centers. Nine other areas are at a third radius, also within the radius of the units digits area. An area at the third radius representing the same digit represented by an area at the second radius occupies the same radial segments as the corresponding area at the second radius. The units areas could be arranged adjacent the terminals which they are connected, but in the case of the ten digits, this is not conveniently possible. Accordingly, all areas at the smallest radius are connected to terminals on flange 32a and all the areas at the other radius are connected to terminals on flange 32b. Conducting leads are brought through the gap left opposite the terminals on flange 32a where the tenth area of the second and third radii is missing. The areas representing the tenth tens digit may be arranged in whatever manner is convenient. Usually this is done by placing them on a fourth radius between the other tens digits and the units digits. They, of course, extend over a radial segment equal to the segment covered by other tens areas, and they are advantageously located diametrically opposite one another on the stationary reference member immediately adjacent their respective terminals. In addition to the areas previously described, it may be desirable to have a common terminal which may be connected through the circuitry on the rotatable counter member to other conductive areas. In the stationary counter member shown in Fig. 35 such a common contact area is connected to a twenty-first terminal on each of the flanges 32a and 32b, with the common areas located at the same radius as the units digits and with these areas diametrically opposed to one another and spaced apart from the segment occupied by all of the units digits on one side of the reference member by $\frac{1}{5}$ revolution on the centers of the respective areas.

The following chart indicates the designators for the various terminals on flanges of stationary counter member 32:

| Flange 32a | Flange 32b | Digit Represented |
|---|---|---|
| a | a' | units digit 0 |
| b | b' | units digit 1 |
| c | c' | units digit 2 |
| d | d' | units digit 3 |
| e | e' | units digit 4 |
| f | f' | units digit 5 |
| g | g' | units digit 6 |
| h | h' | units digit 7 |
| j | j' | units digit 8 |
| k | k' | units digit 9 |
| A | A' | tens digit 0 |
| B | B' | tens digit 1 |
| C | C' | tens digit 2 |
| D | D' | tens digit 3 |
| E | E' | tens digit 4 |
| F | F' | tens digit 5 |
| G | G' | tens digit 6 |
| H | H' | tens digit 7 |
| J | J' | tens digit 8 |
| K | K' | tens digit 9 |
| M | M' | common |

As may be seen in Figs. 36–39, the flanges 32a and 32b of stationary counter member 32 are permitted to protrude beyond the side walls of the housing so that the various terminals 131 may be easily accessible for coupling to external circuitry. In order to make these terminals 131, small holes are drilled through the reference member's insulator sheet backing on which is printed the circuit, and then the conductive coating is applied around the lip of each hole, preferably while printing the rest of the circuit. Leads connect the terminals to the large contact areas in the circuit on the stationary reference member. Cooperating with flanges 32a and 32b and their terminals are plug members generally designated 33. Figs. 36–39 show the plug and the stationary counter member reversed in their position from that they assumed in the counter thus far described, but the principle remains the same. These plug members are advantageously provided with a curved surface 144 which conforms to the shape of the housing so that, when the plug is in place, the surface engages the outer surface of the housing. The plug is advantageously composed of two dielectric blocks 145 and 146. Dielectric block 146 provides the body of the plug, and it is provided with a slot 147. This slot is designed to snugly accommodate a flange on one of the stationary counter members. It is designed so that when the flange 32a, for example, is fully inserted, ball contact members 148 will be in contact with the terminals. The ball contact members lie in cylindrical holes arranged perpendicularly to the slot 147. Each hole has an opening into the slot at which its side walls are tapered to a diameter which is smaller than ball 148 in order to prevent escape of the ball contact member which is under pressure by spring 149. Spring 149 is connected to the conductive portion of insulated wire 150 by a simple solder joint which also holds the spring in place. Wires 150 lie in the groove 151 at the top of block 146. The edge of block 146, which faces the counter is advantageously recessed to accept a flange on block 145. Block 145 when fixed in place by bolts 153 at opposite ends provides a sort of cap member to block 146. Similar plugs are employed for both flanges of each of the stationary reference members of the counter.

Rotatable counter member 110 (see Fig. 31) is supplied with connecting circuitry for connecting together various combinations of terminal members on member 32. Special contact means is advantageously provided for making good contact between the two printed circuits. The special contact means is illustrated in Figs. 32–34. The actual contact means for contacting the fixed circuit contact areas on stationary counter member 32 are balls 135. Each ball is held in its desired location in a tapered hole 136, which at its narrowest end has a diameter smaller than the ball. Spring members 138 are flattened against the surface of the dielectric sheet material composing member 110 and is held in place by rivets 140. Rivets 140 are advantageously located in recessed areas of counter member 110 on the contact side thereof so that they will not inadvertently act as contact members and make contact with a portion of the printed circuit on the fixed circuit of the stationary reference member. In accordance with this arrangement spring member 138 holds ball 135 in the tapered slot. The ball is urged downwardly against the spring when contact is made, the difference between ball diameter and the thickness of the stationary reference member representing the range of axial contact. Advantageously the spring member 138 is of highly conductive material and is fixed by the rivets in close contact with the large area of printed conductive material which is in turn connected with the circuit. The printed circuit of the rotatable counter member is advantageously on the under side of the rotatable counter member, the side opposite that on which the contact elements contact the stationary counter member, so that only these contact members can contact said stationary counter member.

Referring specifically to the connecting circuit on rotatable counter member 110, it will be observed that there are ten units digit contact members each marked V or V'. These contact members also contact common areas connected to terminals M or M'. There are a pair of tens digit contacts marked T and T', respectively, and arranged so that they are radially aligned but at different radii. There are a pair of contact members marked S and S' which are diametrically opposed and which are used to contact the tenth tens unit contact areas representing the tens digit 9. Contacts S and S' are arranged to contact said areas when the contacts T and T' are in the dead space. It will be observed that, as shown, all of the contacts are connected together so that the same signal will appear at each terminal which has an area contacted. It should also be noticed that the units digit contacts are spaced so that there are always a pair of contacts in contact with a pair of the units digit contact areas and also a pair of contacts always in contact with the common areas M and M'. Accordingly, a signal for the other terminals may be applied or taken off at either common terminal. For some applications it is desirable that the units digits be isolated from the tens digits. To isolate the tens digits from the units digits the circuit is broken at the points marked O. Circuits can be broken simply by punching out part of the circuit and its dielectric backing. It is similarly possible to connect together the units digits and the tens digits which have terminals on flange 32a and insulate them from the units digits and tens digits which have terminals on flange 32b. Keeping the terminals on the respective flanges isolated from one another is done by punching out those circuit elements at point P. Thus, it can be seen that by slight modification different contact circuits may be achieved which may be useful for widely different purposes.

Any number of counting circuits can be employed by slight modification of the counter system. It is also possible to modify the size and number of the contact areas in order to obtain different combinations which are useful with binary systems, teletype systems, clock systems, etc. It will be noticed that the same pattern may be repeated for each stage of the counter, the slowest stage in this counter having contact areas representing hundreds and thousands digits, respectively.

The connecting leads between the contact areas and their respective terminals on the stationary counting member are kept extremely narrow in width. Nevertheless, if the contact members on the rotatable counter member are allowed to contact the printed circuit at random, it is possible for the contact members to contact the connecting conductors rather than the contact areas and hence at read-out indicate an erroneous reading of the count. This type of ambiguity is avoided by the rectifying rotation of the present counter. In accordance with the present invention such ambiguity is avoided by causing the rotatable counter member to contact the units contact areas only directly in the centers. Larger contact areas are contacted in points spaced $1/100$ revolution apart. In fact, the contact members will contact the fixed circuit only at intervals of $1/100$ revolution. This being the case, if it is imagined that contact takes place exactly in the middle of the segment, when the segments have been defined by selection of the contact areas and alignment of the contact members to cooperate with them, miscellaneous circuitry other than the contact areas, such as fine line conductive connections may be printed at the edges of the 100 imaginary segments. Then, if ambiguity is all removed, there will be no opportunity for an ambiguous reading because each of contacts will contact only 100 predetermined points and the circuitry of the stationary reference member, except for contact areas is made to avoid these points.

There are two alternatives in avoiding ambiguity. The first of these is positively stopping the device at only discrete positions of the rotatable counter member. The second is correction of the position of the rotatable counter member to a discrete position from wherever it stops. In the preferred version of the counter illustrated in Figs. 8–10 both of these methods are employed.

Figure 11:
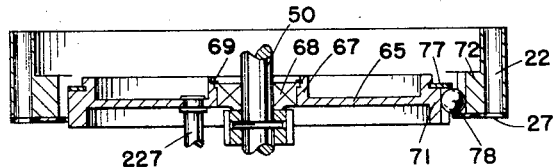
Fig. 11 illustrates in vertical section the rotor and associated counter parts associated with the faster rotatable counter member.
Figure 14A:
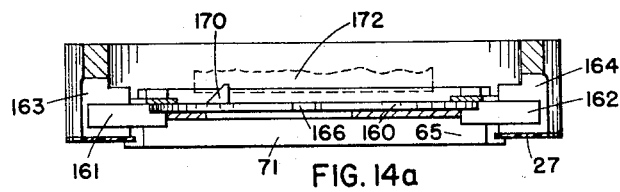
Fig. 14a is a sectional view taken along the slide member as illustrated in Fig. 12.
Figure 14B:
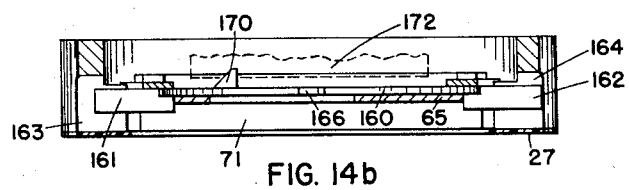
Fig. 14b shows the structure shown in Fig. 14a with the slide moved laterally into contact with the saw tooth wheel on the faster counter member.

The method of stopping the counter only at discrete positions is preferably employed in the first or fastest counting stage of the counter which counts units and tens digits in the decimal counter thus far described. A preferred structure for stopping the rotatable counter member of the first stage is illustrated in Figs. 11–15b. Fig. 11 shows the structure in the region of rotor member 65. The rotor member 65 has a hub 67 and a rim 71. Shown, also, in Fig. 11 is annular housing member 22 which bears the inwardly extending flange 72. Between flange 72 and the rim 71 are three balls 78, which have been previously mentioned. When the counter is counting, as opposed to being in read-out position, these balls in their respective grooves all abut snap ring 77 in rim 71 at their tops and annular ring 27 in the housing side walls at their bottoms.

The slide member 160 (which is omitted from Fig. 11) rests on top of the web portion of rotor 65. At its opposite ends and perpendicular to its major plane are a pair of planar guide members 161 and 162 (see Fig. 13). These guide members are coplanar and are snugly engaged in the housing member 22 in slots 163 and 164, respectively. Location of the guides in these slots permits movement of the slide in the plane of the slots or parallel thereto and prevents movement other than parallel to that plane. The rim 71 is cut away where the slide member 160 must pass in order to permit said slide member to remain flush against the web of rotor 65 when its guide members 161 and 162 are engaged by the slots 163 and 164 in the housing portion 22. Another portion of the rim 71 is cut away and permits the passage of flange 166, which extends generally perpendicularly to guides 161 and 162. A spring 167 is connected between rotor 65 and slide member 160 in such a manner that flange 166 is urged against shoulder 168 formed by rim 71. The spring 167 is arranged generally parallel to the direction of motion prescribed by guides 161 and 162. Slot 169 is located to facilitate this spring coupling. The slide 160 is held in place against the rotor web 65 by snap ring 77 which passes immediately above slide 160.

Mounted on the top of slide member 160 in position to engage a member in the counter system for stopping the motion of the fastest rotatable counter member is a detent 170. The member which detent 170 engages to stop the movement of the fastest rotatable counter member is a saw tooth wheel 172. As may be seen in Fig. 8 saw tooth wheel 172 is advantageously mounted on the rim of counter wheel 113. It can readily be seen that if rotation of this saw tooth wheel is stopped, rotation of the rotatable counter member will also be stopped.

The detent 170 is positioned approximately in line with the guide members 161 and 162. Slots 163 and 164 for these slide members are positioned so that detent 170 can be moved into saw tooth wheel 172. As may be seen in Figs. 15a and 15b, however, the movement is not in line with the diameter of the saw tooth wheel. The reason for this non-diametrical alignment will appear from the description of its operation.

Figure 15A:
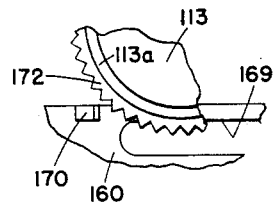
Fig. 15a is a detailed plan view showing the relationship of the detent on the slide and the saw tooth wheel on the faster counter member before engagement.
Figure 15B:
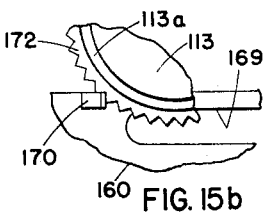
Fig. 15b is a detailed plan view showing the structure of Fig. 15a after the detent on the slide completes its engagement with the saw tooth wheel.
Figure 12:
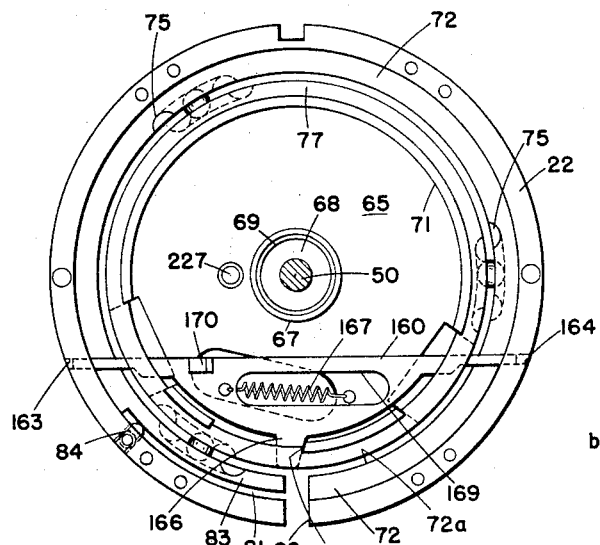
Fig. 12 is a plan view from above of the portion of the structure illustrated in Fig. 11.
Figures 16A, 16B:
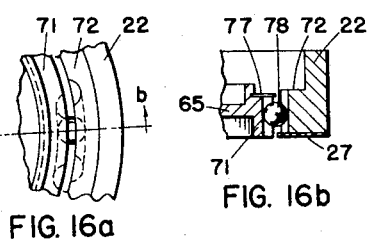
Figures 16C, 16D:
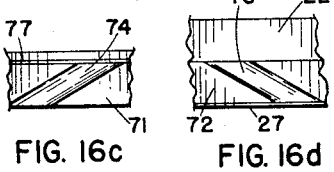
Fig. 16c is a side elevational view looking into the groove on the rotor member.
Fig. 16d is a side elevational view looking into the groove on the annular housing member.

The detent acts to stop rotation of the saw tooth wheel in the following manner. As the axial shaft 50 is withdrawn along the axis of the counter, the rotor will tend to move with it. The direction of the grooves 74 and 75 in the rotor and the housing, respectively, allows movement of the rotor in an axial direction. However, in order to move upward, the balls must follow a pattern which has both axial and rotational components. Hence, the rotor moves rotatably as well as axially. This is the rotation which has been previously referred to as rectifying rotation. Referring to Fig. 12, as rotation occurs counterclockwise, shoulder 168 restricts the movement of flange 166 of slide 160, hence that of the whole slide. Slide 160 is permitted to move under the urging of spring 167 only as shoulder 168 moves. The slide moves only in the direction determined by slots 163 and 164 in member 22 toward the saw tooth wheel 172. Thus, the detent is brought into contact with the saw tooth wheel in such direction that, as the detent advances, its square front and square side walls, which are advantageously at right angles to one another, will mate exactly with one of the valleys of the saw tooth wheel. If contact is first made with the saw tooth wheel in a position other than squarely in a valley, the detent under the urging of spring 167 will seek the valley. The progress of detent 170 during rectifying rotation is illustrated in Figs. 15a and 15b.

Because the detent does not come diametrically into the saw tooth wheel, there is no danger of a point to point collision, and, accordingly, it is almost impossible for the detent to fail to find a valley in the saw tooth wheel. The position of wheel 113 when detent 170 finds a saw tooth valley is such that rotatable counter member 110 is in one of its discrete read-out positions. If there are "n" discrete positions there will be "n" valleys in the saw tooth wheel. Once the detent makes contact with the saw tooth wheel, the slide can move no further, but, because of the spring coupling between slide 160 and rotor 65, the rotor can continue to rotate until rectifying rotation is completed.

A discrete position having been found for the counter member relative to the frame to indicate units and tens digits, it is next necessary to find a discrete read-out position for the counter member representing the hundreds and thousands digits. This is done in a somewhat different manner by virtue of structural elements shown in Figs. 17–21.

Figure 17:
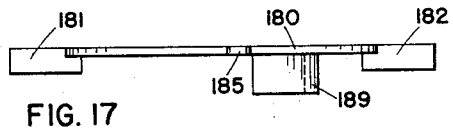
Fig. 17 is a side elevational view of the slide member which is used in conjunction with the second stage or slower counter member rotor member shown in Fig. 10 without the slide member in place.

The slide member 180 of the second and slower stage of the counter is illustrated in Fig. 17. This slide lies flat against the web of rotor 66. As may be seen in Figs. 8–10 and 18 and 19, the rotor has a rim 93 and hub 85 (not visible in Figs. 18 and 19). Portions of rotor 66 and its rim 93 are cut away in order to permit the passage of guide portions 181 and 182 of slide 180, which guide portions are arranged generally perpendicular to the slide 180. These guide portions are engaged in slots 183 and 184, respectively, in annular member 23. The slots and the guides are arranged so that slide member 180 moves only in and parallel to a plane which is parallel to the axis of rotation of rotor 66. Slide member 80 also bears a protrusion 185 which extends into and effectively fills a narrow slot in the rim 93 which slot is bounded by two shoulders 186 and 187 opposing the movement of the protrusion 185 and hence the slide 180. This protrusion 185 has rounded edges of such shape that the protrusion 185 can shift position within the slot defined by shoulders 186 and 187. Thus, as long as slide 180 is free to move the protrusion 185 will not interfere with movement of the rotor. In fact, as the rotor 66 rotates during rectifying rotation, the slide is moved laterally. The slide bears a curved cam follower 189 which extends downwardly, relative to the revolution of the counter in Fig. 8, through a large hole 190 cut in the rotor to permit its passage.

Rotation of rotor 66 advances slide 180 and cam member 189 toward cam surface 190. This cam surface is part of the rotational system of the counter and in this case is advantageously placed on wheel 113 which supports rotatable counter member 110. In fact, it is the inside surface of rim 113a of said wheel. This cam surface is so arranged that the cam follower 189 will strike it when rotatable member 111 has been rotated exactly into one of its discrete positions by virtue of the rotational coupling between the rotor 66 and wheel 116 which is actuated by rectifying rotation of rotor 66. When cam follower 189 strikes cam surface 190, the slide member 180 can move no more, and, accordingly, the rotor member is held against further movement in the same direction because of the contact between shoulder 186 and protrusion 185. Accordingly, this position of the rotor and this position of the counter member will not be changed until the counter is permitted to return to counting position. However, the axial movement of the shaft can not be stopped, and it is for this reason that spring member 88 is interposed between the hub 85 of rotor 66 and the cylindrical surface of tubular member 86. When rotor 66 is no longer able to move, the axial advance of the shaft is not halted but the spring member 88 is compressed, as illustrated in Fig. 9. Fig. 10 represents that position in which the cam has just contacted the cam follower and the spring has not yet started to compress.

As previously mentioned, the cam 190 in this case is part of rim 113a of wheel 113. The cam could, of course, be mounted any place in the counter system provided that it rotates in phase with said system. Of course, assuming the movement of the cam follower to be the same, if the cam had a slower rate of rotation than that of the first counter member (e. g., slower than the fastest counter member), it would require more than one discontinuity, depending upon its speed of rotation. Although one arrangement of cam and follower has been shown, it will be obvious to one skilled in the art that there are many equivalent systems which could be substituted into the counter of this invention without modifying the basic aspects of the counter's operation. However, mounting the cam on the fastest counter member or somewhere where it will rotate at the speed of the fastest rotatable counter member is quite desirable.

The counter is coupled relatively indirectly to the device, the count of which is being taken. Preferably the drive shaft from said device is connected to the input shaft 25 through a heavy walled tubular connector member 195. This connector member 195 may be coupled to the input shaft 25 very simply by placing it around the shaft and then tightening an axial screw 196 so that the frusto conical surface of the screw head bears against the sidewalls of a lateral diametrically arranged slot in the end of input shaft. The wedging effect of the head of screw 196 drives apart the walls split by the slot until said walls are driven into the inside wall of the coupling member 195, which is thus held in place. The drive shaft from the device to be counted may be inserted into the coupling 195 and held in place by radial set screws 197. The input shaft is, in turn, advantageously coupled to the lost motion device which is illustrated in Figs. 24-28.

The lost motion device basically consists of three relatively rotatable members, an input member 201, an output member 202 and an intermediate neutral member 203. Between the input and the neutral member are three balls, 205, which permit relative rotation of these two members. Between the output 202 and the neutral member 203 are three balls 207, permitting relative rotation of the output and the neutral members. It is possible for the three relative rotatable members to be of various shapes, but advantageously they are tubular, or at least that part of them, between the pairs of which are located the balls, is tubular, and advantageously the balls are made to run in shallow grooves in their respective members. Although more balls can be used and means other than balls can be employed, the preferred construction employs three balls equally spaced around the device between each pair of adjacent members. This construction is preferred because the three balls determine a plane, and hence a stable structure, yet they permit a relatively great amount of relative rotation between the members. Advantageously, stop means are furnished between adjacent members, which stop means limit the amount of rotation and provide rest means against which the balls may be held during normal counting rotation of the counter. These stop means are preferably shoulders which the balls abut. For instance, shoulders 211 and 212 on the input and neutral members( respectively, are of this type. There are, also, similar shoulders 214 and 215 on the neutral and output members, respectively. Since the shoulders are spaced 120° apart, it is possible for adjacent members to rotate approximately 240° relative to one another between stops at opposite ends of their ball grooves. Between the relatively rotatable members are located spring members which are advantageously flat springs of coil or spiral form, although another type of spring might be substituted. Connected between the input member 201 and the neutral member 203, and generally coaxially arranged, is spring member 217. Connected between the neutral member and the output member is a similar spring 218. Actually, in the structure shown the springs are connected between the neutral member and a flange portion of the input or output member, respectively, which is arranged to extend to the other side of the neutral member from the position of the member itself. A great number of variations in the structure shown and described will occur to those skilled in the art.

The function of the spring members is to hold the input member 201 and the output member 202 against rotation by holding fixed their positions with respect to the neutral member. The respective opposed members and the neutral member are held in position by butting their respective shoulders against the intervening ball. Rotation is permitted by opposing the spring, but in each case rotation is permitted in a different direction relative to the neutral member. Theoretically, at least, approximately 480° of relative rotation are permitted between the input and output members. The operation of such a lost motion structure is shown graphically in Fig. 29. This graph plots torque along vertical axis against angular displacement along the horizontal axis. It can be seen that in the preferred structure it takes a great deal of force to cause any displacement but once that displacement is produced, it takes relatively a small additional force to bring about complete displacement.

In the actual construction of the lost motion device, the members are advantageously bell shaped, as illustrated. Such an arrangement permits the introduction of the balls between the bells where they are held by a light axial compressive force, introduced by the dimensions and resiliency of the bells. A plurality of balls 220 are introduced between the input and output members to permit their relative rotation yet permit the structure to provide an integral unit. Member 201 has a hub portion 201b which engages a portion of the input shaft and is held against a shoulder thereon by nut 222 which is threadably engaged by a portion of the input shaft. The driving force as mentioned comes through the input shaft and is passed through input member 201 to neutral member 203 then to output member 202. Mounted on output member 202 is a ring gear 225 which engages pinion 226. Pinion 226 is supported on stud 227 which is staked into rotor number 65. Pinion 226 is a planet gear which in turn engages sun gear 229, which is pinned to shaft by pin 230. Thus, the input shaft indirectly drives the central counter shaft 50.

It is the use of the lost motion device which permits the severe shock which is encountered by the counter system when detent 170 engages saw tooth wheel 172. The lost motion device permits lost motion compensation in either direction, and therefore permits the input shaft to keep rotating in either direction while the counter is completely stopped. Then, on being released from read-out position, the counter quickly returns to counting position. Because of the characteristics of the lost motion device which will quickly assume its null position, the counter system will almost immediately regain its natural rotational position rotating at a speed proportional to that of the input shaft.

In cases where the rate of counter rotation is extremely slow, a modified type of input shaft may be employed. This input shaft 25' is illustrated in Fig. 30 and its parts are numbered to correspond to parts previously described with the addition of primes thereto. In this case, however, the part of the input shaft internal of the housing is split in a diametrical slot (see Figs. 30a and 30b). A pin 236 extending through shaft 50' lies in the slot. During ordinary operation, while the counter is counting, pin 236 lies at least partially in the narrow snugly fitting part 235a of the slot. However, as the counter is moved into read-out position and its shaft 50' moves axially, the pin 236 is removed from the narrow part of the slot 235a near its bottom, into a wider part of the slot 235b. In this wider portion of the slot input 25 is given a range of rotation without moving pin 236. The wider the slot 235b and/or the smaller the pin, of course, the greater the amount of rotation of input shaft 25' which can be tolerated. The shoulder 237 between the wide and narrow parts of the slot is preferably beveled so that upon a return from read-out to counting position, the pin 236 may be easily guided back into the narrow portion of the slot 235a.

As can be seen in Figs. 8 and 9, alternate input shaft 48 is a removable member which may be placed in the counter in order to obtain rotation of the counter in the direction opposite to that achieved by input shaft 25. The coupling to the drive in this case can be essentially like the coupling 195 on input shaft 25. Input shaft 48 will, in turn, drive gear 49 which engages gear 46 and drives the input shaft 25 in the direction opposite that to which it would be driven if directly coupled to the drive.

Input shaft 48 is advantageously assembled integrally with a pair of ball bearings separated by a spacer sleeve 240 interposed between the outer races. The spacer 240 is snugly engaged in a cylindrical casing provided in part by tubular flange 242. The inner races of the bearing assembly are held in place at opposite ends by snap ring 241 and a shoulder on input shaft 48. The cylindrical casing is part of base member 10. The bearing assembly is arranged to be slid into place within cylindrical casing 242 and a screw 243 at the end of a passage 244 through the base may be adjusted inwardly until it engages groove 240a. Thus, the input shaft will be held in place relative to the frame by a single screw or similar adjustable engaging means. Such an input shaft assembly may be easily added or easily removed at any time.

Instead of being driven by a shaft, the counter may, of course, be driven by another counter as previously mentioned. In this case, the drive will come through a gear corresponding to gear 47 on the other counter, through gear 47 to gear 46 and the input shaft 25. There may be applications where it may be desirable to have both forward and backward reading counters which are coupled together. Mutual mounting of these counters as previously described is quite simple. The shaft for gear 47 may be a simple stud 246 which threadably engages base 10. The gear 47 is then mounted on the shaft 246. Its hub is held against a shoulder on stud 246 by snap ring 247 which fits into a circumferential groove in stud 246.

Assembly of the device of the present invention may proceed in various ways. However, it is advantageously initiated by making sub-assemblies. Typical of the sub-assemblies which may be pre-assembled are those which involve the rotor members and those which involve the rotatable counter members.

In the assembly of rotor member 65, said rotor is provided with stud member 227 supporting planet gear 226. Slide member 160 may be put in place atop the web of the rotor and spring member 167 connected between the slide and the rotor. Thereafter, snap ring 77 may be snapped into place in the annular groove of rim 71. Completing the rotor assembly, the bearing 68 may be put into position by securing a shoulder on its outer race against a shoulder on hub 67 using a snap ring 69.

In a similar manner rotor 66 may be assembled. First, studs 122 and 125 may be staked into place. Thereafter, slide 180 is advantageously put into position and held there by insertion of snap ring 97. Thereafter, cylindrical bearing means 86 with spring 88 against its flange is slid into position within hub 85, and snap ring 87 is put into place in order to retain bearing member 86 within the hub against the urging of the spring. Bearing 91 is advantageously fixed in place within member 86 at this time.

Rotatable counter member 110 may be mounted on wheel 113 during this sub-assembly stage. At this time the ball contacts are already held in place by spring members 138. The circuit member 110 is angularly correctly aligned with cam member 190 so that these members are located in proper relative phase position. Thereafter, snap ring 114 is put in rim 113a to hold pin 112 and the rotatable counter circuit member 110 in place relative to wheel 113.

Rotatable counter member 111 may likewise be fixed to wheel 116 at this time using snap ring 117 to hold the angular alignment pin and the rotatable counter circuit member 111 in proper position relative to wheel 116.

Assembly of the sub-assemblies on the shaft 50 may then be conveniently accomplished. First, the sub-assembly of rotor 66 is put in place by sliding it upward from the bottom of the shaft as seen in Fig. 8 until the inner race of bearing 91 abuts shoulder means on pinion 120. Thereafter, stationary reference member 32 is placed atop rotatable counter member 110, and the assembly of rotatable counter member 110 is slid onto shaft 50 until hub 113b abuts the inner race of bearing 91. At this point pin 115 is introduced into hub 113b and shaft 50 through an access hole in member 86. Pinning the wheel 113 in place tends to hold rotor 66 against axial movement. Next the assembly of rotor 65 is slid in place until the inner race of its bearing abut the bottom of the hub 113b. Then, sun bear 229 is slid into place until it bears against the inner race of bearing 68 and holds it firmly against hub 113b to prevent its axial movement relative to the shaft. Thereafter, pin 230 is introduced to hold sun gear 229 relative to shaft 50. Care must be taken to see to it that the sun gear properly meshes with planet gear 226.

The remainder of the shaft assembly is accomplished from the other end. Gear 121 is slid over stud 122 so that it meshes with pinion 120. Then, gear 124 is put into place on stud 125 so that it meshes with pinion 123. This way, gear 124 will be atop gear 121. Next, a sleeve 249 is put into position over the top end of the shaft, and over sleeve 249 hub 126b of the assembly of the counter member 111 is slipped. Care must be taken to see that ring gear 127 is meshed with pinion gear 126 so that the members are in proper phase relationship. At this time, pin members 251 may be inserted through four holes in stationary reference member 32 and members 29, 22 and 27 all threaded onto these pins from the bottom. Members 30, 23, 35 and 36 are threaded onto these pins from above. Although it is not clearly apparent from the drawing, snap rings arranged to engage all of these pins 251 may be employed to hold together the assembly thus completed, to hold the respective members in proper relative positions. Immediately before doing this, however, balls 78 and 98, respectively, are introduced in their proper ball grooves between the housing and rotor members. These balls are arranged so that balls 78 lie axially between stop 27 and snap ring 77 and so that balls 98 lie axially between stop 30 and snap ring 97, the snap rings and stops, respectively, contacting the balls when the rotors are in counting position. At this time, radial set screw 84 is driven inwardly against cantalever member 93 until the rotor 65 is held snugly in place. This operation prevents the shifting of the positions of the balls between the rotor 65 and the housing member 22. In a similar manner set crew 100 is driven inwardly against cantalever member 99 so that balls 98 are forced to snugly engage rotor member 66.

At this point the lost motion device may be assembled. This assembly may be completed in various ways. Howveer, the ring gear 225 must first be in position on output member 202. Output member 202 is inverted and the balls 207 are introduced while inserting neutral member 203. The spring 217 may also be introduced between flange 202a and the neutral member. The spring has eyelets at its opposite ends which are arranged to be hooked over rivets on the respective members. Next balls 205 are put into position and held there by input member 201. Spring member 218 is put into position, in a manner similar to that used for 217, between flange 201a and the neutral member. This assembly is then slipped over the input shaft which preferably already has bearing member 57 positioned within clearance space 61. Then, balls 220 are fed in between the flange on input shaft 25 and the flange on output member 202. The engagement of nut 222 by the threaded portion on input shaft 25 permits the application of axial pressure. The resiliency of the various members tends to hold balls 205 and 207 in place. The outer race of bearing 58 may be secured in place in base 10 by snap ring 59. Then the input shaft and the lost motion device as an assembly may be mounted on the base 10 by sliding the shaft into the bearing assembly 58. The input shaft is, in turn, secured in position by snap ring 57. Gear 46 may then be placed in position. As screw 196 is driven inwardly, the split end of the shaft 25 spreads against split hub of gear 46 and, in turn, against the coupling member. Stud 246 with gear 47 may be fixed in place at this time and the reverse drive shaft 48 introduced as previously described.

At this point, as may be seen best in Fig. 41, spring members 42 are introduced into holes in housing member 22. Connection rods 39 are then inserted through aligned openings in the various housing members, but snugly engaged only by a short length of housing member 23. Shoulder 39a bears against spring 42. Connection rods 39 pass through flanges 13b of lever 13, which may be placed in position on base 10 at this time. The end of shaft 39 are engaged in holes in base 10, which hole snugly engage said end. In putting the structure together care must be taken to see that the shaft 50 slides freely within bearing 57 and planet gear 226 mates with ring gear 225. The housing structure may be held in place by a variety of means including threaded engagement of pins in tubular flanges 12. Strap member 40 is provided with slots at its opposite ends which engage narrow portions or circumferential grooves in rods 39. Affixed to strap 40 is an integral assembly for bearing 52 which snugly accommodates the end of shaft 50. Shaft 50 is, in turn, held in place relative to the strap 40 by applying nut 53 to the threaded end of said shaft. Thereafter, the D-shaped end covers may be put into position and held by screws 252.

Some of the details of assembly have not been explained inasmuch as they are conventional expedients and vary from one version of the counter to another. Thus, the insertion of the guides on the respective slides into their respective guides slots has not been described although it takes a certain amount of effort and skill to do the job. It is, of course, obvious from the structure when the job must be done.

The solenoid may be mounted on bracket 16 at any time. In doing this, coil 17 is connected to flange 16 by mounting members 19. The movable core 18 is thereafter connected to lever 13 by pin 15.

Thus assembled, the counter must be aligned, as will hereafter be described, before it is ready for operation. The stationary reference members 32 and 36 instead of being provided with holes of just the right size to accommodate assembly pins 251, mounting screws 252 and connecting rods 39 are provided with slots to permit angular adjustment of members 32 and 36 with respect to each other and the housing during the alignment process before the housing structure is finally tightened.

After the counter has been aligned so that it will give the proper count in the intended manner, it may be put into operation. Counting rotation may be directly imparted through input shaft 25. Alternatively, it may be imparted through shaft 48 through gears 49 and 46. It may, also, be imparted through gears 47 and 46 from another counter. The rotational drive which produces counting rotation of shaft 50 through its coupling and the lost motion device which drives shaft 50 at a speed proportional to the speed of the input member. The effect of driving shaft 50 through the lost motion device, in addition to the protective function, is to achieve an increase in the speed of the counter and an effective reduction of speed and inertia of the counter structure and particularly an increase in the effective range of the lost motion device. This increase in counter speed is accomplished through gears 225, 226 and 229, and may be 4:1. The rotation of shaft 50 produces a rotation of wheels 113 and 116 which, respectively, bear counter members 110 and 111. Thus, as the shaft is rotated, the angular positions of the counter members change, and, hence the count indicated by these members changes. In the counter of Figs. 8–10, rotatable counter member 110 rotates at the speed of shaft 50, but the speed of rotation of rotatable counter member 111 may be varied for different applications depending upon gear ratios employed and the locations of the studs 122 and 125 on rotor 66.

When it is desired to take a counter reading, the solenoid 17 is activated, thereby pulling core member 18 upward. Core member 18 acts upon lever 13, and lever 13 (see Fig. 41), in turn drives rods 39 upward, thereby moving strap 40 upward. The upward movement of strap 40 imparts an upward movement to shaft 50 through bearing 52. It should be noted that the rods 39 make a loose fit with lever 13 but are closely guided by holes in housing members 23 and 10 so that they have essentially only vertical movement. The upward movement of shaft 50 in turn produces upward movement of wheel 116 and counter member 111. Bearing 91 and tubular member 86, and, accordingly, rotor 66 for some distance, also move upward with shaft 50. Likewise, wheel 113 and counter member 110 move upward, as does bearing member 68 and, accordingly, rotor 65. The lost motion device does not move upward, however, as it is not connected to the shaft and the shaft slides in its upward movement within bearing 57. The upward movement also produces relative axial motion between planet gear 226 and spring gear 225. However, planet gear 226 is made sufficiently long so that ring gear 225 never becomes disengaged from planet gear 226.

Because of the upward movement of the shaft 50, rotor member 65 has a rotational movement imparted to it which has been previously referred to as rectifying rotation. Rectifying rotational movement is imparted by the slant of the grooves containing balls 78. This rotational movement angularly displaces from its normal operating position the stud 227 mounting planet gear 226. As stud 227 is displaced, planet gear 226 is free to cooperate with sun gears 229 and ring gear 225 without adversely affecting the input because of the lost motion device. Furthermore, despite the planet gear 226 and sun gear 229 the detent forces shaft 50 and the rotatable counter member 110, which is bears, to a read-out position.

As previously described, this rectifying rotation causes the movement of slide 160 and rotor member 65 in the mating of detent 160 with saw tooth wheel 172. As this mating is completed, wheel 113 is fixed in a specific discrete position relative to the frame. Since wheel 113 is fixed, rotatable counter member 110 is also fixed against rotation. Although shaft 50 and sun gear 229 are also fixed, rotor 65 can still move by virtue of spring coupling 167 to detent bearing slide 160 so that, as it runs around fixed sun gear 229, ring gear 225 must take up all the movement which is absorbed in the lost motion device.

With its rotatable counter member 110 thus angularly fixed in a discrete read-out position, the members associated with the first stage of the counter will continue to advance axially with the shaft until the rotatable counter member's contacts are in contact with the stationary reference members circuitry.

Because of its coupling to the shaft, somewhat indirectly through tubular member 86, rotor member 66 will be urged upward by spring 88 as the shaft moves upward. As this upward movement progresses, slide 180 is urged laterally until the cam follower 189 on slide 180 eventually meets the cam surface on rim 113a of wheel 113. After follower 189 is in contact with the cam surface, no more rotation of rotor 66 can occur and rotatable counter member 111 is in its proper discrete read-out position. When rotor 66 is held against rotation, it is also held against movement. This is the condition shown in Fig. 10. Thereafter, spring 88 may be compressed as rotor 66 remains axially and rotatably fixed. Shaft 50 and rotatable counter member 111 move upward without further rotation so that the spring is compressed axially as shown in Fig. 9. As upward movement progresses the tubular member 86 urges upward spur gear 121 along stud 122 with which it is in axial sliding contact. Spur gear 121, in turn, is in position under spur gear 124 and pushes spur gear 124 upward. Thus, these gears are advanced as the shaft moves axially, and they are kept constantly in mesh with each other, with gear 120 on the shaft and ring gear 127 on wheel 116. Wheel 116 is, of course, fixed to the sleeve bearing 249. After the first stage of the counter is fixed, pinion gear 120 is effectively fixed in place, and gear 121 runs around gear 120 as rotor 66 moves through its rectifying rotation. The rotation imparted to gear 127 as a result of rotation of the rotor and gear 121 is part of the rectifying rotation which is arranged to stop at the proper discrete read-out position of rotatable counter member 111.

Although operation has been previously described herein, before using the counter it is necessary first to accurately align the housing parts, and particularly the stationary counter members, with the rotatable counter members. More accurate alignment of the housing is accomplished by rods 251 (see Fig. 1) which penetrate all of the housing members and hold them relative to one another and the base. These rods may be provided with a head which abuts the shoulder on member 24 at one end and a threaded end portion at the other which engages a threaded hole in flange 12 of base 10. These rods serve to closely align and hold together the housing portions relative to one another. These rod members are not finally tightened relative to one another, however, until after alignment with the rotatable counter members has been achieved. In other words, accurate alignment of the fixed circuitry with respect to the circuit members on the rotatable counter members is first required. In order to secure accurate alignment between stationary and rotatable counter members, rod 252, shown in Fig. 40, is passed downwardly through the grooves 254 in the rotatable counter members and through holes 255 in the stationary counter members (see Figs. 31 and 35). These holes and grooves are formed quite accurately so that when they are aligned, all of the circuits are in proper position relative to one another when all of the circuit elements are in read-out position. The rotatable counter members, as previously mentioned, are provided with key-ways to accept radial pins so that they may be held against rotational movement properly relative to the wheels on which they are mounted. The wheels in turn may be provided with keyways, shown aligned by pin 112 in Figs. 20 and 21. Of course, in aligning the counter, it may be necessary to adjust the counter considerably until the slots 254 in each of the counter members are lined exactly with the holes 255 in the fixed circuit members, but, when this is done, the zero position of the counter or some other selected initial position will be indicated. The enlarged slots 256 permit circumferential adjustment of the position of the fixed circuits in order to obtain exact alignment, but, once such exact alignment has been attained, the fixed circuits may be fixed permanently in position by tightening up the members 251 until the fixed circuit members are unable to move. A properly aligned counter is, of course, prerequisite to accurate readings.

It is, of course, possible to have a one stage counter or a multi-stage counter having more than two counting sections. Special problems are presented by each situation. These problems can be readily solved in using shafts of the types illustrated in Figs. 42 and 43, respectively.

As is indicated in Fig. 42, a one stage counter which is relatively quite simple may be made with the detent construction employed in the first stage of the counter described above. Such a one stage counter suffers from the difficulty of centering the shaft 260 accurately. The problem is solved, however, very conveniently by employing an extra long cylindrical end 261 to shaft 260 which end is snugly engaged by member 262. Cup member 262 provides a long, close tolerance journaled bearing. The rotatable counter member 263 may be fixed directly to the shaft and under it is fixed, in the same manner or similar to the way in which rotor 65 is fixed to shaft 60, a rotor on the order of rotor 65. By making contact with the side walls through balls, or some other plane determining arrangement, the rotor which is employed with this shaft, together with the bearing 262, preserves the exact alignment. The end of the shaft 265 may again be coupled to a strap similar to strap 40 employed in the two stage version.

The shaft shown in Fig. 43 is satisfactory for a three stage counter. This shaft 270 has a long end 271 which, in this case, is advantageously engaged in a frictionless bearing, such as that employed in a two stage counter. A long journaled bearing is unnecessary in this case because there are more than two rotor members in this instance which are more than sufficient for maintaining shaft 270 in its axial position. The rotor of the first stage of the counter advantageously corresponds in construction to rotor 65. The rotors thereafter and their connection members to the shaft correspond to rotor 66 in the two stage version of the counter. Thus, there are a plurality of spring coupled rotors involved, all preferably coupled by springs similar to spring member 88 in the two stage version. The bearing 272 corresponds to the bearing supporting rotor 66 in the two stage version of the counter. Gear 273 corresponds to gear 120 in the two stage version. A sleeve 275 between the rotatable counter member 274 and the shaft 270 is desirable since the members rotate at different speeds. The first major departure from the structure of the Figs. 8–10 version, or any two-stage counter is that the initial pinion gear 276, which functions like the gear 273 as the first gear in the drive for the next stage, is mounted on the sleeve which also provides the mounting for rotatable counter member 274. Finally, the third stage counter member is mounted on journalled sleeve 277. In such a three stage counter member, one counter member or stage drives the next, and, accordingly, the successive counter members must be connected to one another instead of to the shaft. The shaft functions merely as a center of rotation or axis about which rotation takes place. It will, of course, be necessary for faster moving members to find their discrete positions before the slower members are permitted to do so, so that the cam associated with the fastest member will contact first, followed by the next fastest, etc. This is necessary because each counter member is dependent upon the previous counter members' discrete position to determine its own discrete position. Accordingly, the lower digits must be determined first, before the positions of higher digits can be ascertained. It should be mentioned that cam members are advantageously mounted on the rotatable counter member of the stage previous to that one which they are designed to effect, just as it is done in the case of cam 190 on wheel 113.

Reference to Fig. 44 illustrates the order of taking effect of the various elements in the counter and illustrates the relative amounts of movement required to produce these effects in one version of the preferred counter structure.

In addition to the variation in the number of stages employed, it is possible to have great variation in the counter structure itself. The structure illustrated in Fig. 45 is one of many possible modified forms of the counter of the present invention. In its modified forms the counter retains its fundamental similarities to the counter of Figs. 8-10. However, there are many changes in the details of construction and some changes in the actual mode of operation of the structure. The structure of Fig. 45 is, therefore, intended to show the wide range of possible structural designs of which the present invention is capable.

It will be immediately observed that, in this case, the solenoid winding 270 is coaxially located so that its core 271 may be located on the same axis as the counter shaft 50″. Such a construction makes possible direct coupling and eliminates all necessity for the lever and linkage systems such as are employed in the Figs. 8-10 structure. Of course, the Figs. 8-10 structure could be modified using the same type of counter elements but employing an axially located solenoid such as 270.

In order to accommodate the axially located solenoid 270, a modified type of housing, generally designated 273, is employed. No base, corresponding to base 10 in Fig. 8, is required. However, the housing must be of elongated and of special construction in order to accommodate the solenoid structure. As a practical matter, the end of the housing is advantageously composed of a cup-like casing 274, which is provided with various shoulders, openings and the like to accommodate the various elements of the structure. Through the bottom of cup 274 is introduced the input shaft 25″ which is bearing mounted, preferably by frictionless bearing 58″, to rotate relative to the cup portion 274 of the housing 273 on the axis of the housing. Also, axially located is a lost motion device, generally designated 275, which is advantageously the device of Figs. 24-28. As in the case of the lost motion device of the previously described structure, this lost motion device is coupled to an axially located, axially moveable, rotatable shaft 277 through a ring gear (not shown) on the lost motion device 275 and sun gear 278 on shaft 277. A planet gear 279 is interposed between the sun gear and the ring gear to complete the gear system. Gear 279 is supported by a stud from deck 280, which deck may be supported upon a shoulder within the casing 274.

Immediately above the deck 280 is a spider-like spring 282 such as may be seen in Fig. 48. This spider-like spring is held in place relative to the housing by tubular member 283 which provides a shoulder for supporting solenoid 270 and which itself is fixed to the side walls. At its center, spring 282 is suppported in an annular groove in the solenoid core 271. Thus, spring 282 which has a natural position flat against deck 280 will tend to hold solenoid core 271 in the position shown.

The solenoid core 271 is axially moveable through sleeve 285, however, in response to energization of solenoid coil 270. Shaft 277 is itself axially moveable in the upward direction and may be so moved by axial movement of core 271 which abuts flange hub 287a of disc 287 which is held in place by pin 288. When core 271, which is coaxial with shaft 277, but completely out of contact therewith, moves upwards against hub 287a, it will accordingly move shaft 277 upward. Gear 287 is sufficiently long axially that its upward movement will not cause it to be disengaged from planet gear 279. Solenoid winding 270 is held in place by an annular disc-like member 290 which is, in turn, held in place by snap ring 291.

As previously mentioned, shaft 277 is not directly coupled to shaft 50″, but it is coaxial with said shaft. The coupling between the shafts is such as to permit their relative rotation but to cause them to move axially in unison. For instance, frictionless bearing 293 may accomplish this purpose. Actuating shaft 277 is gear coupled to shaft 50″ through ring gear 295 on disc 287, planet gear 296 and sun gear 229′. Planet gear 296 is suppported on rotor 65′ by a stud which may be press fitted into rotor 65′.

Disc 287 has a primary function as a brake in the system described, it being the portion of the brake in the rotatable system or the counter system. The other part of the brake is mounted on the housing and is advantageously a metallic annulus 298 supporting a ring of rubber 299 or like material.

The housing in this instance differs from the housing in the structure of Figs. 8-10 in that it is composed of more sections of thinner material. The use of this thinner material facilitates machining of the pieces and enables accurate assembling and ease in completion of the structure of Fig. 45. Not all portions of the housing will be described in detail, but specific parts may be described as they have reference to the counter structure within the housing.

The operation of this device is essentially similar to that of the device of Figs. 8-10, and, accordingly, rectifying rotation is employed. In order to accomplish this rectifying rotation, rotor members 65′ and 66′ similar to the rotors employed in the Figs. 8-10 structure are employed. As in the previous case, bearings 86′ and 91′ are employed between the respective rotors and the shaft 50″ in order to permit the shaft to rotate relative to the rotors during counting rotation. In this instance, the rotors are made of such diameter that their cylindrical periphery is snugly engaged by the housing sidewalls. In addition, radially projecting pins 301 and 302, respectively, are snugly engaged by helical slots in members 304 and 305 of the housing 273. These pins function in much the same way as the balls 78 and 98 do in the structure of Figs. 8-10. There are preferably four such pins at equal angles from one another around the periphery of the rotor. This has not been shown in Fig. 45 but is illustrated in Fig. 46. It should be pointed out that due to the nature of this device, unlike the device of Figs. 8-10, it is necessary that a rotor 65′ stop its rotation and axial movement after the proper location of the first rotatable counter member has been determined. Thus, it is necessary for the shaft to be able to move relative to the rotor. Provision for this relative movement is accomplished by spider-like spring members similar to spring 282 previously described and shown in Fig. 48, which springs are designated 307a and 307b, respectively. These springs are fixed to opposite sides of the rotor by bracket members 308a and 308b which are annular in shape and which may be fixed together and relative to the rotor by screw or other similar means. At their inner edges these spring members 307a and 307b overlap and embrace the outer race of the bearing 68′ and tend to center the rotor 65′ with the bearing 68′. Thus, the bearing 68′ is free to move as a whole relative to the rotor 65′ in opposition to the springs 307a and 307b.

Also new in this device is a lever system which does essentially the same job in a different way from the slide in the Figs. 8-10 version of the counter. For instance, lever 310 is radially directed and of a generally sheet metallic construction. Lever 310 has a long arm 311 and a short arm 312. The lever 310 rides in a groove or cut which is radially directed in the rotor 65′. It is held in place by a pin 313, which, in turn, is held in place in a groove transverse to the slot by annular bracket member 308b. Lever arm 311 has a wedge-like shape, tapering its width slightly for some distance inward from its outer edge. Its outer edge is rounded but snugly engaged in a laterally or circumferentially extending slot which extends over a segment or angle of rotation of the rotor equivalent to the maximum distance covered by rectifying rotation. The end of lever 311 which rides in this slot in the housing wall is, accordingly, always maintained at the same axial level despite a change in its rotational position. However, as will be later described, lever 312 is moved as a result of movement of the rotor so that it eventually contacts the outside surface of ring gear 295 in which are formed a plurality of cam surfaces 314 (see Fig. 49). The effect of this contact will be described later.

As in the case of rotatable counter member 110 in Figs. 8–10, rotatable counter member 110' in this case may have a printed circuit and spring loaded ball contacts (which are not shown) or it may be of different construction. The wheel supporting the rotatable counter member 110' is, in this case, member 113' which differs structurally from wheel 113 of the previous version of the structure of the Figs. 8–10. Cam member 190' is shown as a separate member from wheel 113' and, in this case, is on the outside surface rather than the inside surface of its supporting member. In other respects the cam and the cam action is quite similar to that of the cam in the preferred version of the counter, despite physical differences in the structural parts, particularly in the follower but also in the cam.

The fixed circuit 32', or stationary reference member, is advantageously essentially like that member in Figs. 8–10. This is true of the other stationary reference member 36' in the second stage. Again plugs 33', essentially like that described in connection with Figs. 36–39, may be employed to cooperate with the terminal flanges of stationary reference members 32' and 36'.

The cam follower system used with rotor 66' consists of lever 315 whose outer edge rides in a circumferential slot similar to that in which lever 311 rides. Fig. 47 shows the housing member 316 which provides the circumferential slot (the rectangular slot near its bottom) which need be only the maximum length laterally or circumferentially moved by the end of lever 315 during rectifying rotation. This lever also rides in a radial slot in rotor 66' and is pinned by member 318 to said rotor. The short lever arm 319 in this case is arranged to act as cam follower to cam 190'. Pin 318 is held in place by annular bracket 320b. Brackets 320a and 320b hold in place the outer edges of spider-like springs 88a' and 88b' which correspond to springs 307a and 307b. The respective inner edges of springs 88a' and 88b' extend over the opposite ends of the outer race of bearing 91' and tend to hold said bearing midway between them. Accordingly, the coupling in this particular case is not too different from the spring coupling permitting relative axial movement between the rotor 66 and shaft 50 after the rotor has stopped rotation as in the version of Figs. 8–10. Essentially the same end is accomplished in both cases.

The speed reduction gear connections between the shaft 50' and the second rotatable counter member 111' is essentially the same as that of Figs. 8–10 version and, hence, need not be described. However, in this version, the end suspension of the shaft 50" is somewhat different. In this case, end cap 322 is spring mounted by coil spring 323 against the end of the housing which is closed, rather than being open to accommodate a diametrically arranged strap, as is the case in the Figs. 8–10 construction. More specifically, spring 322 extends between cap 322 and end wall 324. Shaft 50" is terminated in a rounded end which will run smoothly against cap 322. Cap 322 also fits over the end of hub 116b' which also accepts the shaft 50".

In operation, counting rotation is imparted to input shaft 25" of the counter, which in turn, drives shaft 277 through the lost motion device 275. Shaft 277 drives disc 287, and shaft 50" is, in turn, driven by disc 287 through the gear system interconnecting the two as previously described. Rotatable counter member 110' and its mounting wheel 113' are directly fixed to the shaft and so rotate at the same speed as shaft 50". This rotation occurs relative to rotor 65', which during counting rotation, does not move. Slower rotational movement is imparted to the second counter member 111' on wheel 116' through pinion gear 120' on shaft 50", and the gear system previously described, to the ring gear 127. Rotor 66', like the rotor 65', is stationary during counting rotation.

As in the previous counter, axial upward movement is required to bring the counter into read-out position. This axial movement is imparted by energization of the solenoid 270 which produces axial movement of core 271. Core 271 abuts hub 287a which, because it is fixed to shaft 277, drives shaft 277 axially upward. The upward movement of shaft 277 also drives upward shaft 50' through bearing coupling 293. Within a very short axial distance (almost immediately) the disc 287 is in contact with the stationary brake member 299 so that the movement of said disc is brought to a halt. Stopping disc 287 in this manner does not stop cam 314 in any discrete read-out position and, accordingly, may be referred to as a "stop anywhere" system as opposed to a "discrete position" system. Actually, it is merely a variation upon the second stage of the counter shown in Figs. 8–10.

As the shaft 50" is advanced axially upward, it causes rotor 65' to move upward and follow the pattern of movement established by its pins 301 in the slots in the housing, thus producing rectifying rotation. In the course of this rectifying rotation, lever 310 is moved as the rotor is moved, but, even though the level of pin 313 is raised, the level of the end of lever 311 can not be raised because of its retention in the slot in the housing. Thus, slight rotation of lever 310 about shaft 313 occurs. In the course of this rotation lever 312 is brought into contact with the cam surface 314. When lever 312 contacts cam surface 314, rotor 65' can move no further. In fact, rotation of the shaft 50' is completely stopped because the motion imposed by ring gear 295 had already been stopped and because, upon stopping, the rotation of the shaft imposed by planet gear 296 as it rotated inside ring 295 to drive sun gear 229' has been stopped. The circuitry is so positioned on rotatable counter member 110' that, as a result of the cam effect between cam member 314 and lever follower 312, it will be stopped at its proper discrete read-out position. Axial movement of shaft 50" continues, however, against the resistance of spring 307b.

The stopping of counter member 110' and shaft 50" will also stop cam member 190', and, thereafter, the cam follower lever 319 on rotor 66', which has been moving inward as a result of the upward movement of rotor 66', contacts the cam and determines the position of rotatable counter member 111' in one of its discrete read-out positions. Again the cam follower is moved as a result of rotation around pin member 318 of the lever 315 which is held in place by the slot in the housing. As the rotor 66' rotates, it causes rotation of the gear system meshed with pinion gear 120, and thus causes motion to be imparted to rotatable counter member 111'. When cam follower lever 319 contacts cam 190', however, further rotation of the rotor 66' is stopped, and, hence, further rotation of the rotatable counter member 111 is stopped. At this point rotatable counter member 111' is in its proper discrete read-out position. Nevertheless, shaft 50" may still continue axial movement against the added resistance of spring 88b'. After the reading is made, springs 323, 88b', and 307b will all urge the return of shaft 50" and the counting system to its counting position.

Many other variations of the present invention and modifications of the versions described will occur to those skilled in the art. For instance, the counter constructions herein described lend themselves very well to direct reading counter members instead of circuit read-out arrangements. As may be seen in Figs. 49–50, such counters lend themselves easily to direct reading versions. For instance, in order to obtain a simple direct reading counter using the structure described, minor modifications are required. A tubular calibrated scale 320 is mounted on the periphery of counter member 110. A similar scale 321 is mounted on the periphery of counter member 111. Windows 323 and 324 are provided in the housing structure. Fig. 49 illustrates a position which may be achieved by the counter which has only the detent and saw tooth wheel of the first stage engaged. Fig. 50 illustrates the position of the counter after rectifying rotation has been completed and the counter members are in read-out position. In such a modification, it will, of course, be unnecessary to have any circuitry on the rotatable counter member and the fixed circuitry members 32 and 36 may be completely eliminated. Alternatively, it is possible to have a combination of a direct reading and a circuitry counter so that an operator can visually see the count while the record of the count is being made electrically.

Many other modifications of the present invention within the scope of the claims will occur to those skilled in the art. All such modifications are intended to be within the scope and spirit of the present invention.

I claim:

1. A mechanical counter comprising a reference frame, a counter member mounted to rotate on an axis relative to the frame such that the angular position of the counter member on said axis relative to the frame indicates the count and arranged to be coupled to its drive through a rotational counting system, means acting between the frame and the rotational counting system of which the counter member is a part to stop the counting rotation of the counter member, means producing rectifying rotation of the counter to a read-out position, including an axially moveable member, and means stopping the counter in the course of the rectifying rotation at the proper one of "n" discrete read-out positions, the angular displacement between adjacent read-out positions being 360/n, and a resilient coupling in the structure between the axially moveable member and the means stopping rectifying rotation of the counter member permitting the axially moveable member to complete the balance of a constant amount of movement after the rectifying rotation of the counter has been stopped.

2. A mechanical counter comprising a reference frame, a counter member mounted to rotate on an axis relative to the frame such that the angular position of the counter member on said axis relative to the frame indicates the count and arranged to be coupled to its drive through a rotational counting system, means acting between the frame and the rotational counting system of which the counter member is a part to stop the counting rotation of the counter member, means producing rectifying rotation of the counter member to a read-out position, including an axially moveable member, means stopping the counter member in the course of the rectifying rotation including a cam in the counting system, which cam accordingly rotates when the counter member rotates, and a cooperating follower which moves into contact with the cam in the course of rectifying rotation wherein the cam and follower are so arranged that when the follower contacts the cam the counter member will stop relative to the frame in one of its discrete read-out positions, and a resilient coupling between the axially moveable member and the rest of the means producing the rectifying rotation of the counter member permitting the axially moveable member to complete the balance of a constant amount of movement after rectifying rotation of the counter has been stopped.

3. A device for producing rectifying rotation of a rotatable counter member to one of its proper discrete read-out positions comprising, in combination with the counter system which produces rotation of the counter member and with the frame with respect to which the counter member is rotatable, a rectification rotor mounted to have limited rotation with respect to the frame, a slide member having parts slidably engaged by the frame and having a portion which may be moved into contact with the counter system such that when said portion of the slide makes contact with the counter system the counter member will be fixed in a discrete read-out position, said slide being moveable as the rotor is moved by virtue of its coupling to the rotor, such that the rotor acts both to restrict the movement of the slide toward contact with the counter system and to urge its movement toward contact with the counter system.

4. A device for producing rectifying rotation of a rotatable counter member to one of its proper discrete read-out positions comprising, in combination with the counter system which produces rotation of the counter member and with the frame with respect to which the counter member is rotatable, a rectification rotor, balls at intervals around the rotor, said balls being contained in slots in the frame and the rotor, respectively, said slots being of such orientation with respect to one another to permit limited relative rectifying rotation between the rotor and the frame, a slide member having parts slidably engaged by the frame and having a portion which may be moved into contact with the counter system such that when said portion of the slide makes contact with the counter system the counter member will be fixed in a discrete read-out position, said slide being moveable as the rotor is moved due to a coupling to the rotor which urges movement of the slide toward said contact and due to restriction of its movement by contact of a part of it with a part of the rotor.

5. A device for producing rectifying rotation of a rotatable counter member to one of its proper discrete read-out positions comprising, in combination with the counter system which produces rotation of the counter member and with the frame with respect to which the counter member is rotatable, a rectification rotor, balls at intervals around the rotor, said balls being contained in slots in the frame and the rotor, respectively, said slots being oriented with respect to one another so that motion between the rotor and the frame will have an axial as well as a rotational component, a shaft member on the axis of rotation of the rotor coupled to the rotor to permit relative rotation therebetween and to move the rotor axially as said shaft is moved axially to produce rotational movement of the rotor due to the configuration of the slots containing the balls, a slide member having parts slidably engaged by the frame and having a portion which may be moved into contact with the counter system such that when said portion of the slide makes contact with the counter system the counter member will be fixed in a discrete read-out position, said slide being moveable as the rotor is moved due to its coupling to the rotor in a manner which urges movement of the slide toward contact with the counter system.

6. A device for producing rectifying rotation of a rotatable counter member to one of its proper discrete read-out positions comprising, in combination with the counter system which produces rotation of the counter member and with the frame with respect to which the counter member is rotatable, a rectification rotor having a planar generally circular surface and a generally tubular flange member at its periphery, an annular portion of the frame surrounding said tubular member, balls at intervals around the rotor, said balls being contained in slots in the annular portion of the frame and in the generally tubular flange of the rotor, respectively, a sheet metallic slide member lying flat atop the planar portion of the rotor, having a contact portion which may be moved into contact with the counter system and having two portions which extend through discontinuities in the tubular flange of the rotor, each of said portions terminating in co-planar members which lie generally perpendicular to the plane of the slide and define the direction of movement of the slide, said co-planar members being snugly engaged in slots in the frame which permit movement only in the plane of the co-planar members and a third portion of the slide contacting a shoulder formed in the tubular flange of the rotor which shoulder restricts movement of said third portion, and hence of the slide and its contact portion toward contact with the counter system, and coupling means between the slide and the counter member urging said contact portion of the slide into contact with the counter system such that when said contact is complete the counter member will be fixed in a discrete read-out position.

7. A structure as described in claim 6 in which a radial slot extends from the inner surface part way through the annular portion of the frame adjacent one of the ball grooves and joins one end of a circumferential slot in said annular portion extending behind said ball groove, thereby forming a cantalever portion of the housing, and a radial member extending inwardly from the outer surface of the annular portion of the frame which radial member is made to contact said cantalever portion and by its inward moment to urge said cantalever portion inwardly.

8. A structure as described in claim 6 in which a snap ring is fitted into a groove in the generally tubular flange of the rotor on the opposite side of the slide from the planar generally circular surface of said rotor in order to hold said slide in place.

9. A device for producing rectifying rotation of a rotatable counter member into one of its proper discrete read-out positions comprising, in combination with the counter system which produces rotation of the counter member and with the frame with respect to which the counter member is rotatable, a rectification rotor mounted to have limited rotation with respect to the frame, a braking member in the counter system which rotates with said system, a slide member having parts slidably engaged by the frame and bearing a member cooperating with the braking member, which member may be moved into contact with the braking member in order to stop the counting rotation of the rotatable counter member, and resilient coupling between the slide and the rotor which coupling urges movement of the slide in such direction that the member cooperating with the braking member is urged toward the braking member, said movement of the slide being limited by a portion of the rotor against which the slide bears.

10. A structure as described in claim 9 in which the braking member is a wheel having a saw tooth periphery and the member on the slide cooperating with the wheel is a detent which is engageable by the valley portions of the saw toothed wheel, there being "n" valleys corresponding to the "n" numbers indicated by the "n" discrete positions of the counter member, said valleys being 360/n degrees apart.

11. A structure as described in claim 9 in which the braking member is a wheel having a triangular saw tooth periphery and the member on the slide cooperating with the saw tooth wheel is a detent the contacting region of which conforms in shape exactly with the shape of the valley portions of the saw tooth wheel, the slide being arranged so that one plane contacting surface of the detent is parallel to the direction of motion of the slide and so that the detent will contact the wheel in an off-diameter location where that saw tooth wall opposite the parallel plane contacting surface of the detent will be generally parallel to said surface and in contact with said surface when the detent is fully engaged and in which the resilient coupling between slide and rotor is a spring member.

12. A structure as described in claim 6 in which the contact portion of the slide is a detent which is moved into contact with a rotatable wheel which wheel is part of the counting system and which wheel has a saw tooth periphery which engages the detent in its valley portions, there being "n" valleys corresponding to the "n" numbers indicated by the "n" discrete positions of the counter member, said valleys being 360/n degrees apart.

13. A structure as described in claim 6 in which the contact portion of the slide is a detent which is moved into contact with a rotating wheel which is part of the counting system and which wheel has a saw tooth periphery the valley portions of which mate with the contact surfaces of the detent, the teeth of the wheel being triangular and the slide being so arranged that one plane contacting surface of the detent is parallel to the direction of motion of the slide and so that the detent will contact the wheel in an off-diameter location where that saw tooth wall opposite the parallel plane contacting surface of the detent will be generally parallel to said surface and in contact with said surface when the detent is finally engaged and in which the resilient coupling between the slide and the rotor is a spring member.

14. A device for producing rectifying rotation of a rotatable counter member into one of its proper discrete read-out positions comprising, in combination with the counter system which produces rotation of the counter member and with the frame with respect to which the counter member is rotatable, a rectification rotor mounted to have limited rotation with respect to the frame, coupling between the rotor and the rotatable counter member such that the rotation of the rotor produces rotation of the counter member, a cam member in the counter system which rotates with said system, and a slide member having parts slidably engaged by the frame and bearing a cam follower which when it contacts the cam prevents further movement of the slide and portions of the rotor engaging the slide so that the rotor can move only when the slide moves.

15. A device for producing rectifying rotation of a rotatable counter member into one of its proper discrete read-out positions comprising, in combination with the counter system which produces rotation of the counter member and with the frame with respect to which the counter member is rotatable, a rectification rotor having a planar generally circular surface and a generally tubular flange member at its periphery, an annular portion of the frame surrounding said tubular member, balls at intervals around the rotor, said balls being contained in slots in the annular portions of the frame and the generally tubular flange of the rotor, respectively, a sheet metallic slide member lying flat atop the planar portion of the rotor, said slide bearing a cam follower which may be moved into a cam in the counting system and having two portions which extend through discontinuities in the tubular flange of the rotor, each of said portions terminating in co-planar members which lie generally perpendicular to the plane of the slide and define the direction of movement, said co-planar members being snugly engaged in slots which permit movement only in the plane of the co-planar members, and a third portion of the slide extending between a pair of shoulders formed by the tubular flange on the rotor, which shoulders urge and restrict, respectively, movement of that third portion and hence the slide and the cam follower, said third portion cooperating with the shoulders so that when the rotor moves the slide moves and when the slide stops the rotor stops.

16. A mechanical counter comprising a housing having annular side walls, a rotatable shaft axially located within the annular side walls, at least one rotatable counter member supported on said shaft, and support means preserving the axial alignment of the shaft but permitting both the rotation and axial movement of said shaft, at least one of said support means consisting of a radially extending coaxially arranged disc-like rotor, said rotor being bearing coupled at its center to the shaft to permit rotation of the shaft relative to the rotor and to necessitate axial movement of the rotor with axial movement of the shaft and said rotor cooperating with the annular side walls of the housing to permit rectifying rotation of the rotor while maintaining the position of said rotor normal to the axis and the position of the shaft on the axis.

17. A mechanical counter comprising a housing having annular side walls, a rotatable shaft axially located within the annular side walls, at least one rotatable counter member supported on said shaft, support means preserving the axial alignment of the shaft but permitting both the rotational and axial movement of said shaft, at least one of said support means consisting of a radially extending, coaxially arranged disc-like rotor, said rotor being bearing coupling at its center to the shaft to permit rotation of the shaft relative to the rotor and to necessitate axial movement of the rotor with axial movement of said shaft and said rotor cooperating with the annular side walls of the housing to permit rectifying rotation of the rotor while maintaining the position of said rotor normal to the axis and the position of the shaft on the axis, a diametrically arranged strap at one end of the housing, and a bearing connection between the strap and the shaft whereby axial movement of the strap will produce axial movement of the shaft and whereby the shaft is free to rotate relative to the strap.

18. A mechanical counter comprising a housing having annular side walls, a rotatable shaft axially located within the annular side walls, at least one rotatable counter member supported on said shaft, support means preserving the axial alignment of the shaft but permitting both the rotation and axial movement of said shaft, at least one of said support means consisting of a radially extending, coaxially arranged disc-like rotor, said rotor being bearing coupled at its center to the shaft to permit rotation of the shaft relative to the rotor and to necessitate axial movement of the rotor with axial movement of said shaft and said rotor cooperating with the annular side walls of the housing to permit rectifying rotation of the rotor while maintaining the position of said rotor normal to the axis and the position of the shaft on the axis, a diametrically arranged strap at one end of the housing, a bearing connection between the strap and the shaft whereby axial movement of the strap will produce axial movement of the shaft and whereby the shaft is free to rotate relative to the strap, actuating means mounted on the frame, lever means at the opposite end of the frame from the strap extending between the actuating means and the frame and having portions at diametrically opposite sides of the frame corresponding to the opposite ends of the strap, a pair of rigid connection members located at opposite sides of the frame and extending between the lever and the ends of the strap, said connection members being guided by the frame and resiliently coupled to the frame so that they are urged in opposition to the urging of the more powerful actuating means.

19. A mechanical counter comprising a housing having annular side walls, a rotatable shaft axially located within the annular side walls, at least one rotatable counter member supported on said shaft, support means preserving the axial alignment of the shaft but permitting both the rotation and axial movement of said shaft, one of said support means consisting of a radially extending, co-axially arranged disc-like rotor, said rotor being bearing coupled at its center to the shaft to permit rotation of the shaft relative to the rotor and to necessitate axial movement of the rotor with axial movement of said shaft and said rotor cooperating with the annular side walls of the housing to permit rectifying rotation of the rotor while maintaining the position of said rotor normal to the axis and the position of the shaft on the axis, and the other support means consisting of an elongated sleeve type journal bearing at one end of the shaft in which the shaft is free to slide axially.

20. A mechanical counter comprising a housing having annular side walls, a rotatable shaft axially located within the annular side walls, at least one rotatable counter member supported on said shaft, and support means preserving the axial alignment of the shaft but permitting both the rotation and axial movement of said shaft, said support means including a pair of radially extending, co-axially arranged disc-like rotors each of which is bearing coupled at its center to the shaft to permit rotation of the shaft relative to the rotor and to move axially with said shaft and each of which cooperates with the annular side walls of the housing to permit slight rotational movement of the rotor while maintaining the position of said rotor normal to the axis and the position of the shaft on the axis.

21. A mechanical counter comprising a housing having annular side walls, a rotatable shaft axially located within the annular side walls, at least one rotatable counter member supported on said shaft, and support means preserving the axial alignment of the shaft but permitting both the rotation and axial movement of said shaft, at least one of said support means consisting of a radially extending, coaxially arranged disc-like rotor which is bearing coupled at its center to the shaft to permit rotation of the shaft relative to the rotor and to move axially with said shaft and which has a cylindrical face opposed by and in contact with a co-axial cylindrical surface of the annular member with pin-like members extending radially from the cylindrical surface of the rotor into slots in the annular member which closely engage said pins and which precisely guide the rotational and axial movement of the shaft and its associated members.

22. A mechanical counter comprising a housing having annular side walls, a rotatable shaft axially located within the annular side walls, at least one rotatable counter member supported on said shaft, support means preserving the axial alignment of the shaft but permitting both the rotation and axial movement of said shaft, at least one of said support means consisting of a radially extending, co-axially arranged disc-like rotor, which rotor is bearing coupled at its center to the shaft to move axially with said shaft and which rotor has a cylindrical face opposed and close spaced to a coaxial cylindrical surface of the annular member, in which opposed surfaces are formed slots and balls within said slots which balls are snugly engaged between the rotor and the annular member, the balls and slots guiding and limiting the rotational and axial movement of the rotor.

23. A structure as described in claim 22 in which there are three opposed sets of slots, each containing one ball, such that the portion of the annular member behind one of its slots is a cantilever member which may be moved radially inwardly in order to eliminate unwanted clearances between the balls and their respective slots.

24. A mechanical counter comprising a housing having annular side walls, a rotatable shaft axially located within the annular side walls, at least one rotatable counter member supported on said shaft, and support means preserving the axial alignment of the shaft but permitting both the rotation and axial movement of said shaft, at least one of said support means consisting of a radially extending, coaxially arranged disc-like rotor coupled at its center to the shaft in a bearing arrangement including a resilient coupling member which causes the rotor to move axially with the shaft until said rotor is stopped from further rotation, whereupon the resilient coupling yields to permit axial movement of the shaft to continue.

25. A structure as described in claim 24 in which a ball bearing assembly is affixed to the shaft so that its inner and outer races move with the shaft, a second bearing permitting relative axial movement of the rotor and shafts between the ball bearing and the rotor, abutting shoulders on the two parts of the second bearing member limiting their relative axial movement, and a spring between the parts of the second bearing urging their shoulders together and capable of compressing to permit the shaft to continue its axial movement after the rotor is stopped.

26. A mechanical counter comprising an annular body portion, a shaft arranged axially within the annular body portion, first and second rotors extending between the shaft and the annular body portion, the rotors being so mounted that axial movement of the shaft produces rectification rotation in the rotors, a pair of counter members mounted on the shaft to rotate relative to the frame about the shaft as an axis, the pair being coupled together to rotate at a predetermined rate relative to one another, such that there are "$r$" discrete positions of the slower counter member spaced $1/r$ revolution apart, each of the "$r$" positions of the slower counter member representing exactly the count of an integral number of full revolutions of the faster member where the ratio of speeds of the faster to the slower counter member is $r:1$, coupling means between the second rotor and the slower counter member for producing rectifying rotation of the slower counter member through at least $1/r$ revolution and means including a cam on the faster counter member cooperating with the rotor coupled to the slower counter member to stop the rectifying rotation of said slower counter member at one of the "$r$" discrete positions.

27. A mechanical counter comprising a reference frame having an annular body portion, a shaft arranged axially within the annular body portion, first and second rotors extending between the shaft and the annular body portion, the rotors being so mounted that axial movement of the shaft produces rectifying rotation in the rotors, a pair of counter members mounted on the shaft to rotate relative to the frame about the shaft as an axis, the pair being coupled together to rotate at a predetermined rate relative to one another, such that there are "$r$" discrete positions of the slower counter member spaced $1/r$ revolution apart, each of the "$r$" positions of the lower counter member representing exactly the count of an integral number of full revolutions of the faster counter member where the ratio of speeds of the faster to the slower counter member is $r:1$, coupling means between the second one of the rotors and the slower counter member for producing rectifying rotation of the slower counter member through at least $1/r$ revolution and means including a cam on the faster member cooperating with the second rotor coupled to the slower counter member to stop the rectifying rotation of said slower counter member at one of the "$r$" discrete positions and a detent bearing slide on the first rotor, which detent cooperates with a saw tooth wheel on the faster counter member to stop said faster counter member in one of its "$n$" discrete positions represented by the engagement of the detent with one of "$n$" valleys of the saw tooth wheel.

28. A structure as described in claim 27 in which structure the second rotor which is coupled to the slower counter member is spring coupled to the shaft such that the shaft can move even though the second rotor cannot, in which structure the means on said second rotor which cooperates with the cam is a slide bearing a cam follower, which slide has guide members arranged in slots in the annular portion of the frame, said slots maintaining the movement of the slide parallel to a plane, and which slide is provided with a portion which cooperates with the second rotor in such a way that movement of said second rotor produces movement of the slide to advance the cam follower toward the cam and that the movement of the slide and the second rotor is interdependent and one cannot move if the other does not move.

29. A structure as described in claim 27 in which structure the second rotor which is coupled to the slower counter member is spring coupled to the shaft such that the shaft can move even though the second rotor cannot, in which structure the means on said second rotor which cooperates with the cam is a slide bearing a cam follower, which slide has guide members arranged in slots in the annular portion of the frame said slots maintaining the movement of the slide parallel to a plane and which slide is provided with a portion which cooperates with the second rotor in such a way that movement of said second rotor produces movement of the slide to advance the cam follower toward the cam and that the movement of the slide and the second rotor is interdependent, one cannot move if the other does not move, in which structure the first rotor is rigidly connected to the faster counter member and in which structure the slide on said first rotor has guide members arranged in slots in the annular portion of the frame said slots defining a plane of movement of the slide, which slide is provided with a resilient coupling to said first rotor urging the detent on the slide toward the saw tooth wheel and which slide has a portion which abuts a shoulder on first rotor limiting the movement of the slide under the urging of the resilient coupling.

30. A structure as described in claim 27 in which structure there is a gear connection between the faster and slower counter members said gear connection consisting of a first pinion gear affixed to a cylindrical surface of a coaxial member fixed to the faster counter member, first and second studs fixed to the second rotor, an integral first spur gear and second pinion gear mounted on the first stud to rotate about said first stud so that the first spur gear meshes with the first pinion gear, an integral second spur gear and third pinion gear mounted on the second stud to rotate about said second stud so that the second spur gear meshes with the second pinion gear and a ring gear fixed to the slower counter member so that the ring gear meshes with the third pinion gear.

31. A structure as described in claim 27 in which structure there is a gear connection between the faster and slower counter members said gear connection consisting of a first pinion gear affixed to a cylindrical surface of a coaxial member fixed to the faster counter member, first and second studs fixed to the second rotor, an integral first spur gear and second pinion gear mounted on the first stud to rotate about said first stud so that the first spur gear meshes with the first pinion gear, an integral second spur gear and third pinion gear mounted on the second stud to rotate about said second stud so that the second spur gear meshes with the second pinion gear and a ring gear fixed to the slower counter member so that the ring gear meshes with the third pinion gear wherein the gears on the studs on the second rotors are axially moveable on those studs and the first spur gear is above a shoulder on the shaft so that when the second rotor does not move with the shaft the first spur gear will be moved axially by said shoulder and will in turn move the second spur gear so that all the gears in the system are always in mesh.

References Cited in the file of this patent

UNITED STATES PATENTS

| Number | Name | Date |
|---|---|---|
| 1,360,867 | Bearens | Nov. 30, 1920 |
| 1,913,983 | Gardner | June 13, 1933 |
| 2,222,164 | Avery | Nov. 19, 1940 |
| 2,364,385 | Ochsenbein | Dec. 5, 1944 |
| 2,496,585 | Harper | Feb. 7, 1950 |
| 2,558,631 | Suter | June 26, 1951 |
| 2,622,805 | Avery | Dec. 23, 1952 |
| 2,666,912 | Gow et al. | Jan. 19, 1954 |
| 2,668,013 | Dawson | Feb. 2, 1954 |